United States Patent
Wu et al.

(10) Patent No.: US 11,429,586 B2
(45) Date of Patent: Aug. 30, 2022

(54) EXPRESSION UPDATE VALIDATION

(71) Applicant: SAP SE, Walldorf (DE)

(72) Inventors: Frank Wu, Palo Alto, CA (US); Tu Truong, San Jose, CA (US); Michael Kunzmann, Palo Alto, CA (US); Hameesh Manadath, Palo Alto, CA (US); Hansen Chen, Burnaby (CA); Makoto Sugishita, Osaka (JP); Masamitsu Ochiai, Sunnyvale, CA (US)

(73) Assignee: SAP SE, Walldorf (DE)

( * ) Notice: Subject to any disclaimer, the term of this patent is extended or adjusted under 35 U.S.C. 154(b) by 402 days.

(21) Appl. No.: 15/389,362

(22) Filed: Dec. 22, 2016

(65) Prior Publication Data

US 2018/0181608 A1 Jun. 28, 2018

(51) Int. Cl.
*G06F 16/23* (2019.01)
*G06F 16/2455* (2019.01)
*G06F 16/242* (2019.01)
*G06F 40/205* (2020.01)

(52) U.S. Cl.
CPC ...... *G06F 16/2365* (2019.01); *G06F 16/2423* (2019.01); *G06F 16/24564* (2019.01); *G06F 40/205* (2020.01)

(58) Field of Classification Search
CPC ............. G06F 16/2365; G06F 16/2423; G06F 16/24564
See application file for complete search history.

(56) References Cited

U.S. PATENT DOCUMENTS

| | | | |
|---|---|---|---|
| 8,214,382 B1* | 7/2012 | Biere | G06F 16/245 707/761 |
| 2007/0043702 A1* | 2/2007 | Lakshminarayanan | G06F 16/832 |
| 2007/0150469 A1* | 6/2007 | Simonyi | G06F 16/90344 707/E17.039 |
| 2008/0195610 A1* | 8/2008 | Tin | G06F 16/8365 |
| 2010/0268725 A1* | 10/2010 | Wang | G06F 16/3338 707/765 |

(Continued)

OTHER PUBLICATIONS

Plotkin, "Alice—The Personal Pascal," *Antic*, vol. 6, No. 2, Jun. 1997, www.atarimagazines.com/v6n2/Alice.html, 6 pages.

*Primary Examiner* — Kannan Shanmugasundaram
(74) *Attorney, Agent, or Firm* — Klarquist Sparkman, LLP

(57) ABSTRACT

Technologies are provided for validating expression updates. A change to an editable expression can be detected by a client computing device and an expression update describing the detected change can be transmitted to an application server over a bidirectional communication channel. The application server can analyze the expression update to determine whether the detected change resulted in a valid expression. Analyzing the expression update can comprise locating an entity identifier in the detected change and searching a database to determine whether the identified entity exists. The application server can also determine whether a given user has permission to access the identified entity. The application server can transmit expression update validation information back to the client computing device over the bidirectional communication channel. The client computing device can update a user interface displaying the expression based on the validation information.

18 Claims, 19 Drawing Sheets

(56) References Cited

U.S. PATENT DOCUMENTS

| | | | |
|---|---|---|---|
| 2011/0119299 A1* | 5/2011 | Fra | H04M 1/72577 |
| | | | 707/769 |
| 2014/0025704 A1* | 1/2014 | Jin | G06F 16/9535 |
| | | | 707/770 |
| 2015/0074069 A1* | 3/2015 | Baeuerle | G06F 16/245 |
| | | | 707/702 |

* cited by examiner

EXPRESSION UPDATE VALIDATION

BACKGROUND

Some computer applications allow users to create and edit expressions that can be included in queries that are processed by databases. Some of these applications attempt to validate such expressions before allowing them to be saved or run against a database as part of a query. However, such validation attempts do not often extend beyond performing rudimentary checks for syntactical correctness.

Therefore, there is room for improvement in technologies related to validating user-edited expressions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, a method for validating a query expression update comprises receiving a query expression update from a client computing device over a bidirectional communication channel; determining that the query expression update is syntactically valid; determining that the query expression update contains an entity identifier; determining whether an entity associated with the entity identifier is defined in a database; if an entity associated with the entity identifier is defined in the database, transmitting a message to the client computing device, over the bidirectional communication channel, indicating that the expression update is valid; and otherwise, transmitting a message to the client computing device, over the bidirectional communication channel, indicating that the expression update is invalid.

In another embodiment, one or more computer-readable media store instructions that, when executed by one or more processors, cause the one or more processors to perform operations, the operations comprising receiving messages from a client computing device over a bidirectional communication channel, wherein the messages comprise successive expression updates to an expression; validating the expression updates, wherein validating an expression update comprises modifying an expression tree based on the expression update, detecting an entity identifier in the modified expression tree, transmitting a request to a data store to verify the existence of an entity in the data store associated with the entity identifier, and receiving a response from the data store indicating whether an entity associated with the entity identifier exists in the data store; and transmitting expression validation responses to the client via the bidirectional communication channel, wherein an expression validation response indicates whether a corresponding expression update includes an entity identifier associated with an entity in the data store.

In another embodiment, a system for validating expression updates comprises a client computing device comprising a processor and a memory storing executable instructions that, when executed by the processor, cause the client computing device to perform operations, the operations comprising: displaying a query expression in a user interface component, detecting a modification of the query expression in the user interface component, asynchronously transmitting a description of the modification of the query expression to an application server over a bidirectional communication channel, receiving a response from the application server via the bidirectional communication channel indicating that the modification of the query expression is invalid, updating the user interface component to display an indication that a modified portion of the query expression is invalid, and preventing the invalid query expression from being saved; and the application server, wherein the application server comprises another processor, another memory storing other executable instructions that, when executed by the another processor, cause the application server to perform other operations, the other operations comprising receiving the description of the modification via the bidirectional communication channel, updating an expression tree in an expression validation session associated with the bi-direction communication channel, wherein the expression tree is updated based on the description of the description of the modification, detecting an entity identifier in an updated portion of the expression tree, determining that the entity identifier is not associated with a data entity in a database connected to the application server, and transmitting the response to the client computing device via the bidirectional communication channel, indicating that the modification of the query expression is invalid.

As described herein, a variety of other features and advantages can be incorporated into the technologies as desired.

DETAILED DESCRIPTION

Example 1—Overview

Figure 1:
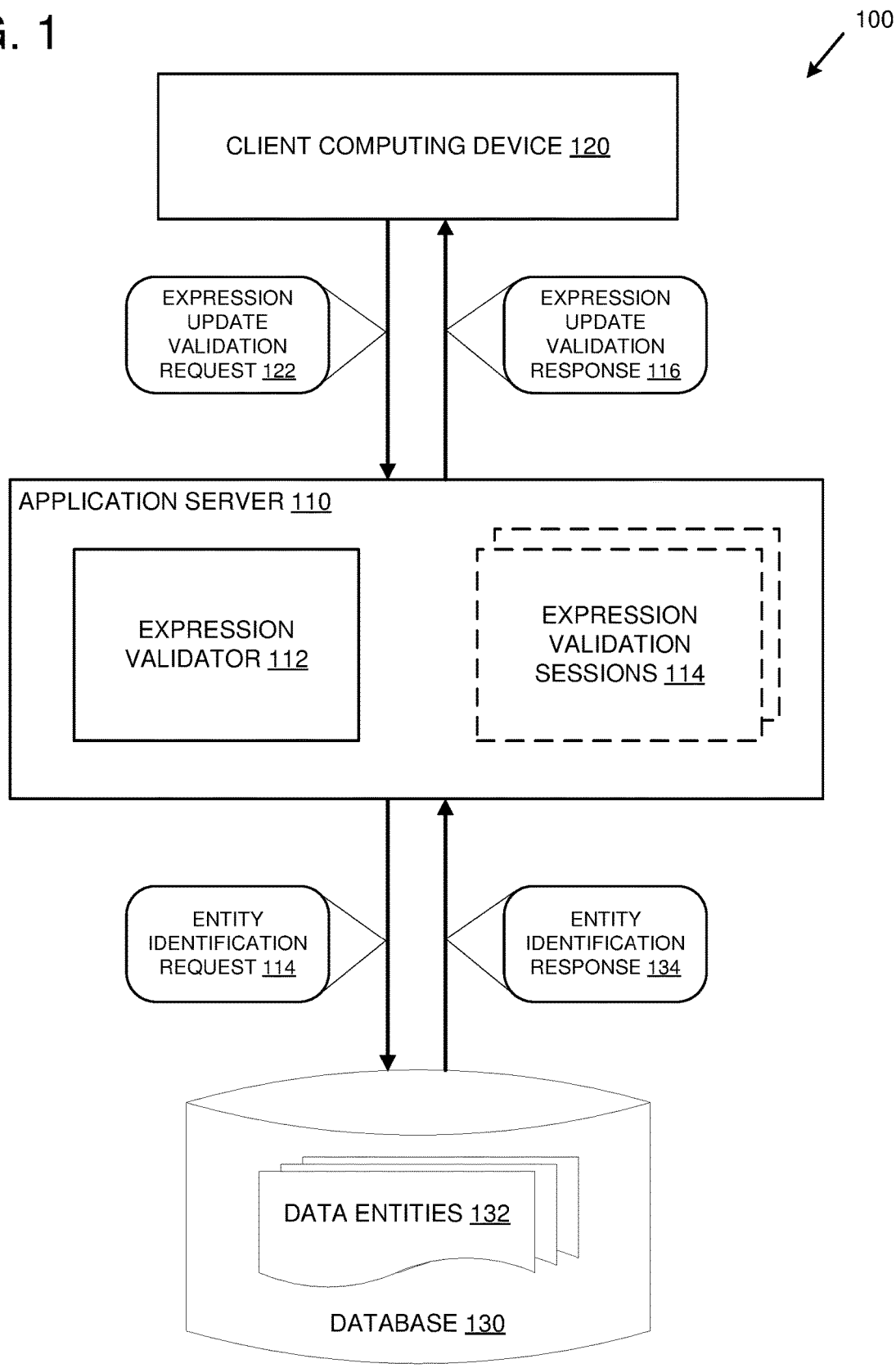
FIG. 1 is a system diagram depicting an example system for expression update validation.

The description provided herein is directed to technologies for validating updates to editable expressions.

Some applications allow users to edit query expressions that are then processed by databases. However, such applications perform only rudimentary syntactical validation on edited expressions, if they perform any validation at all. This can be problematic in some situations where edited expressions include identifiers for entities defined in a database. In a scenario where an expression has been edited to include an identifier for an entity that does not exist in the database, a syntactical evaluation of the expression may indicate that the expression is valid when, in fact, the expression will fail when it is processed by the database because the identified entity is not defined. Additionally, syntactic validation cannot detect when an expression has been edited to include an identifier for an entity that the user is not allowed to access. In this situation too, syntactic validation may indicate that the edited expression is valid, when in fact it may fail when it is processed (or worse yet, allow the user to gain access to the restricted data entity).

Various technologies described herein can be used to validate expression updates by determining whether the expression updates are syntactically valid and whether the expression updates include valid entity identifiers. A client computing device can be provided which allows a user to edit an expression. The client computing device can be configured to detect a change made to the expression and to transmit an expression update validation request to an application server using a bidirectional communication channel. The application server can comprise an expression validator that determines the syntactical correctness of the expression update and whether the expression update includes an entity identifier. If the expression update includes an entity identifier, the application server can transmit an entity identification request to a database. The database can transmit a response to the application server, indicating whether an entity associated with the entity identifier is defined in the database. The application server can transmit an expression update validation response to the client computing device that indicates whether the expression update resulted in a valid expression.

Various technologies described herein can be used to validate expression changes using an expression validation session. An expression builder user interface can be provided that allows a user to edit an expression. The expression builder user interface can detect a change made to the expression and can asynchronously transmit an expression change notification via a bidirectional communication channel to an expression validation session on an application server. The expression validation session can update an expression tree based on the expression change notification. The expression validation session can use the updated expression tree to locate an entity identifier in the updated portions of the expression tree and to transmit a request to a data store to determine whether an entity associated with the entity identifier exists. The expression validation session can transmit expression validation information to the expression builder user interface via the bidirectional communication channel. In at least some embodiments, the expression validation session can comprise a user identifier that is provided to the data store. In such embodiments, if the entity identifier is associated with an entity, the expression validation session can determine whether the identified user has permission to access the identifier entity.

Various technologies described herein can be used to provide validation feedback to a user as the user edits an expression. A client computing device can be provided that comprises an expression builder user interface. A user can use the expression builder user interface to edit an expression. The client computing device can be configured to detect changes to the expression and to transmit expression update messages to an application server via a bidirectional communication channel. The client computing device can receive expression update validation messages in response from the application server via the bidirectional communication channel. The expression update validation messages can comprise validation information pertaining to the detected changes. The expression builder user interface can display visual indicators, identifying portions of the expression that are invalid and/or that are valid entity identifiers, based on the validation information.

Example 2—Validating Expression Updates

In any of the examples described herein, a system can be provided for expression update validation using a bidirectional communication channel.

FIG. 1 is a system diagram depicting an example system 100 for expression update validation. The example system 100 comprises a client computing device 120, and application server 110, and a database 130.

The client computing device 120 is configured to transmit an expression update validation request 122 to the application server 110 via a bidirectional communication channel. The expression update validation request 122 can comprise information describing a modification made by a user of the client computing device 122 to an expression. The expression, in at least some embodiments, can be a query expression that can be used as part of a query that is processed by a database. A query can be created using the query expression (for example, by combining the query expression with a query template to generate the query) and the query, including the query expression, can be executed against a database (such as the database 130).

In at least some embodiments, the client computing device 120 comprises a user interface component configured to display the expression and to enable the user to edit the expression. In such an embodiment, the client computing device can be configured to automatically detect changes to the expression made by the user and to asynchronously transmit the detected changes as expression update validation requests (e.g., 122) to the application server 110 using the bidirectional communication channel. Such expression update validation requests can be transmitted as the user continues to edit the expression via the user interface component.

In a particular embodiment, the user interface component can be an expression editor that is part of an application development program running on the client computing device 120.

The application server 110 is configured to receive the expression update validation request 122 via the bidirectional communication channel and to validate an update to the expression described in the expression update validation request 122 using an expression validator 112. The expression validator 112 is configured to analyze the update to the expression to determine whether the expression has been updated in a way that is valid. In at least some embodiments, the update to the expression contained in the expression update validation request 122 can comprise a string of characters that represents a modification made to the expression. For example, the expression update can comprise one or more characters that have been added to the expression. Additionally or alternatively, the expression update can comprise a portion of the expression that remains after one or more characters have been deleted and/or updated.

The expression validator 112 can be configured to parse the expression update using one or more delimiters, and to search for one or more entity identifiers in the parsed expression update. If an entity identifier is found in the parsed expression update, the entity identifier can be transmitted as part of an entity identification request 114 to the database 130. The database 130 can be configured to process the entity identification request 114 by searching data entities 132 stored in the database 130 for a data entity that is associated with the entity identifier.

In at least one embodiment, the entity identification request 114 comprises a query that, when processed by the database 130, will cause the database 130 to search a series of entity definition records for one or more entity definition records associated with the provided entity identifier. In such an embodiment, information about defined data entities 132 can be stored in entity definition records separate from instances of the data entities 132. For example, instance data for instances of defined data entities 132 can be stored in one or more data structures (such as one or more database tables) and the one or more entity definition records for the data entities 132 can be stored in one or more different data structures. Alternatively or additionally, metadata defining one or more of the data entities 132 can be stored in one or more data structures in combination with instance data for instances of the one or more of the data entities 132.

In at least one embodiment, the database 130 can be a relational database and the data entities 132 can comprise one or more relational database tables. In such an embodiment, the entity identifier provided in the entity identification request 114 can be compared against names of the one or more relational database tables and/or names of data columns defined as part of the one or more relational database tables.

The database 130 is configured to transmit an entity identification response 134 to the application server 110. The entity identification response 134 can comprise a value indicating whether or not a data entity associated with the entity identifier was found in the database 130. In at least one embodiment, if an entity associated with the entity identifier was found, the entity identification response 134 can comprise information about the identified data entity. The information about the identified data entity can include an entity type associated with the data entity. For example, the entity identification response 134 may indicate whether the identified entity is a table, column, function, etc.

In some cases, more than one data entity in the database 130 may be matched to the provided entity identifier. In such cases, the database 130 can return more than one matched entity identifier as part of the entity identification response 134. For example, the entity identification request 114 can indicate that the database 130 may allow partial matches when comparing the provided entity identifier to identifiers associated with the data entities 132. In a particular embodiment, a data entity can be matched to the provided entity identifier if an identifier associated with the entity contains (but does not exactly match) the provided entity identifier. In a different or further embodiment, the data entity can be matched to the provided entity identifier that does not match, but is similar to, the provided entity identifier. In such embodiment, fuzzy search techniques can be used to identify entity identifiers that are similar to the provided identifier.

The application server 110 is configured to receive the entity identification response 134 and to determine whether the expression update is valid based, at least in part, on whether an entity associated with a detected entity identifier exists in the database 130. The application server 110 is configured to transmit an expression update validation response 116 to the client computing device 120 via the bidirectional communication channel. If an entity identifier was found in the expression update, but in entity associated with the entity identifier was not found in the database 130, the expression update validation response 116 can include a value that indicates that the expression update is not valid. However, if an entity identifier was found in the expression update, and an entity associated with the entity identifier was found in the database 130, the expression update validation response 116 can contain a value that indicates that the expression update is valid.

Optionally, the application server 110 can comprise one or more expression validation sessions 114. In some embodiments, an expression validation session can be associated with the bidirectional communication channel connecting the client computing device 120 and the application server 110. Prior to allowing a user to edit an expression, the client computing device 120 can transmit a request to the application server 110 to establish an expression validation session. In at least one embodiment, the request to establish the expression validation session can be a Hypertext Transfer Protocol (HTTP) request.

In response to receiving the request to establish an expression validation session, the application server 110 can create an expression validation session, establish the bidirectional communication channel with the client computing device 120, and associate the bidirectional communication channel with the expression validation session. In a particular embodiment, the application server 110 can support multiple simultaneous expression validation sessions with multiple client computing devices. In such an embodiment, the application server 110 can be connected to the multiple client computing devices by separate bidirectional communication channels that are associated with different expression validation sessions.

Figure 2:
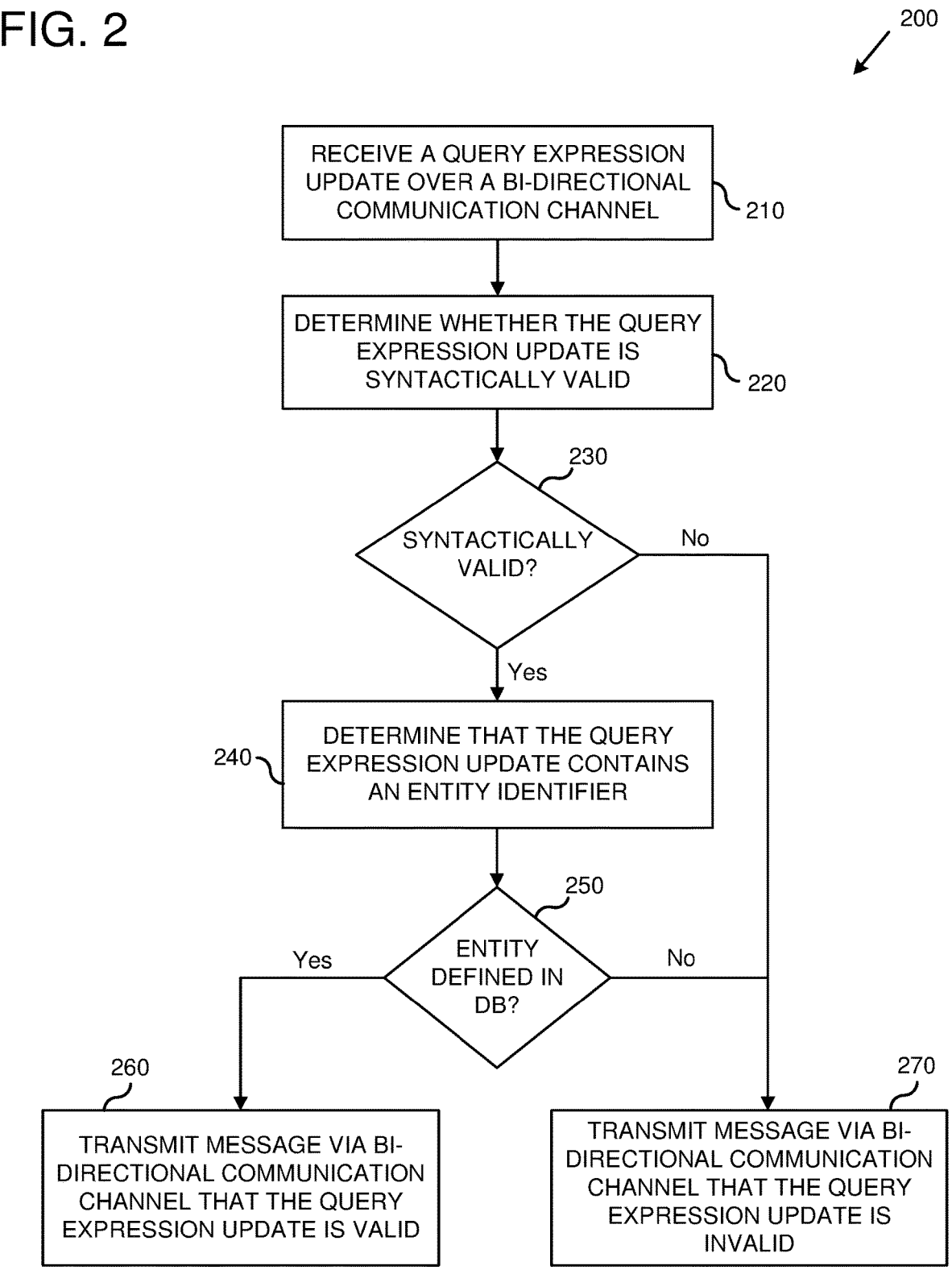
FIG. 2 is a flowchart depicting an example method for validating a query expression update.

FIG. 2 is a flowchart depicting an example method 200 for validating a query expression update. Any of the example systems described herein can be used to perform the example method 200.

At 210, a query expression update is received over a bidirectional communication channel. The query expression update can be received from a client computing device configured to transmit a query expression update over the bidirectional communication channel when a change to a query expression is detected. The query expression update can comprise one or more characters representing a portion of the query expression that has been added and/or modified.

At 220, it is determined whether the query expression update is syntactically valid. For example, the added and/or modified portion of the query expression included in the query expression update can be analyzed to determine whether or not it satisfies one or more rules of a programming language syntax (such as a syntax for the Structured Query Language (SQL), the Procedural Language Extension to SQL, JavaScript, etc.). In some embodiments, the query expression update can be determined to be syntactically valid if the provided portion of the query expression satisfies the one or more rules of the programming language syntax. In a different or further embodiment, a representation of the entire query expression, including the added and/or modified portion provided by the query expression update, can be analyzed using the one or more rules of the programming language syntax. In such an embodiment, the query expression update can be determined to be syntactically valid if the entire query expression, including the added and/or modified portion, satisfies the one or more rules of the programming language syntax.

In at least one embodiment, multiple programming language syntaxes can be supported. The multiple programming language syntaxes can be associated with separate sets of one or more rules. One of the sets of rules can be selected to analyze the provided portion of the query expression update (or the entire updated query expression) based on a programming language type associated with the query expression. In a further embodiment, the programming language type associated with the query expression can be provided as part of the query expression update. Additionally or alternatively, the programming language type can be defined by a pre-configured setting or as part of an expression validation session state associated with the bidirectional communication channel.

At 230, the results of the syntactical analysis performed at 220 are evaluated to determine whether the query expression update is syntactically valid. If the query expression update is syntactically valid, then at 240 the query expression update is analyzed to locate an entity identifier contained within the provided portion of the query expression. If the query expression update is not syntactically valid, then at 270 a message is transmitted via the bidirectional communication channel indicating that the query expression update is invalid. In one embodiment, the message indicates only that the query expression update is invalid. In a different embodiment, the message indicates that the query expression update resulted in a syntactically invalid expression. Alternatively or additionally, information about the one or more syntax rules that were not satisfied by the query expression update can be included in the message.

At 240, it is determined that the query expression update contains an entity identifier. The provided portion of the query expression can be parsed using one or more delimiters. The delimited portion of the query expression can then be searched for an entity identifier. In a particular embodiment, the query expression update can be parsed using one or more operator identifiers as the delimiters. In at least some embodiments, the programming language syntax used at 220 can define keywords and/or operators that are associated with various functionalities of the programming language. Example operators include arithmetic operators, relational operators, logical operators, bitwise operators, assignment operators, etc. The operators and/or keywords of the programming language syntax can represent core features of the programming language that cannot be used as entity identifiers. By parsing the query expression update, using the operators and/or keywords as delimiters, an identifier that it is not one of the operators and/or keywords (and thus may be an entity identifier) can be isolated.

At 250, it is determined whether the identifier is associated with an entity defined in a database. If an entity associated with the identifier as defined in the database, then at 260 a message is transmitted by the bidirectional communication channel indicating that the query expression update is valid. Optionally, details about the entity (such as the entity's name, a name of a parent entity, names of one or more child entities, access permissions, etc.) can be retrieved from the database and included as part of the message, or as part of a separate message transmitted by the bidirectional communication channel optionally, the message can indicate that the query expression update resulted in a syntactically valid expression.

If no entity defined in the database is associated with the entity identifier, then at 270 a message is transmitted via the bidirectional communication channel indicating that the query expression update is invalid. Optionally, the message can include the entity identifier and a value indicating that the entity identifier is not associated with a defined entity.

Example 3—Example Bidirectional Communication Channels

In any of the examples described herein, a bidirectional communication channel can comprise two-way communication over a transmission medium. Example bidirectional communication channels include full-duplex physical communication media (such as full-duplex wired connections), and logical connections over multiplexed media (such as wireless transmission protocols). A bidirectional communication channel can comprise two-way socket-level communication. For example, a bidirectional communication channel can comprise a Transmission Control Protocol (TCP) session between a socket on client computing device and a socket on an application server.

In some embodiments, the client computing device can comprise a web browser hosting a web page comprising an expression builder user interface that comprises Hyper Text Markup Language (HTML) form elements and JavaScript code. In such an embodiment, the bidirectional communication channel can comprise a WebSocket connection between the web browser and the application server, a Comet connection between the web browser and the application server, or the like.

Messages transmitted over a bidirectional communication channel can comprise one or more data packets routed over a computer network. Since a client computing device can transmit expression update messages asynchronously as updates are made to an expression, in some cases expression update messages and expression update validation responses can be transmitted across the bidirectional communication channel at the same time. In such cases, the client can receive an expression update validation response and update a user interface based on the expression update validation response while new expression update messages are transmitted to the application server. Similarly, the application server can process an expression update message and transmit an expression update validation response while a new expression update message is being received.

Example 4—Example Entities

In any of the examples described herein, an entity can be a construct defined in a database or data store. In at least some embodiments, an entity can be a construct defined for storing data in the database or data store. Such entities can be referred to as "data entities." Example data entities include database tables, database table columns, data fields, etc. In an embodiment comprising an object-oriented data store, example data entities can include object definitions. In an embodiment comprising a document store, example data entities can include document schemas and/or templates. In at least some embodiments, instances of a data entity can be stored in a database or data store where the data entity is defined. Example data entity instances include database table rows, database table row field values, objects, documents, etc. In at least some cases, data entity instances can be retrieved from the database or data store where one or more data entities are defined by providing a query to the database or data store, wherein the query comprises one or more data entity identifiers.

In at least some embodiments, an entity can be a functional construct stored in a database or data store. Such entities can be referred to as "functional entities." Example functional entities include user-defined functions, stored procedures, views, triggers, indexes, etc. In at least some embodiments, a functional entity can be accessed and/or invoked by providing a query to the database or data store where the functional entity is defined, wherein the query comprises an entity identifier associated with the functional entity.

Example 5—Validating Expression Updates Using Expression Trees

In any of the examples described herein, a system can be provided for expression update validation using an expression validation session.

Figure 3:
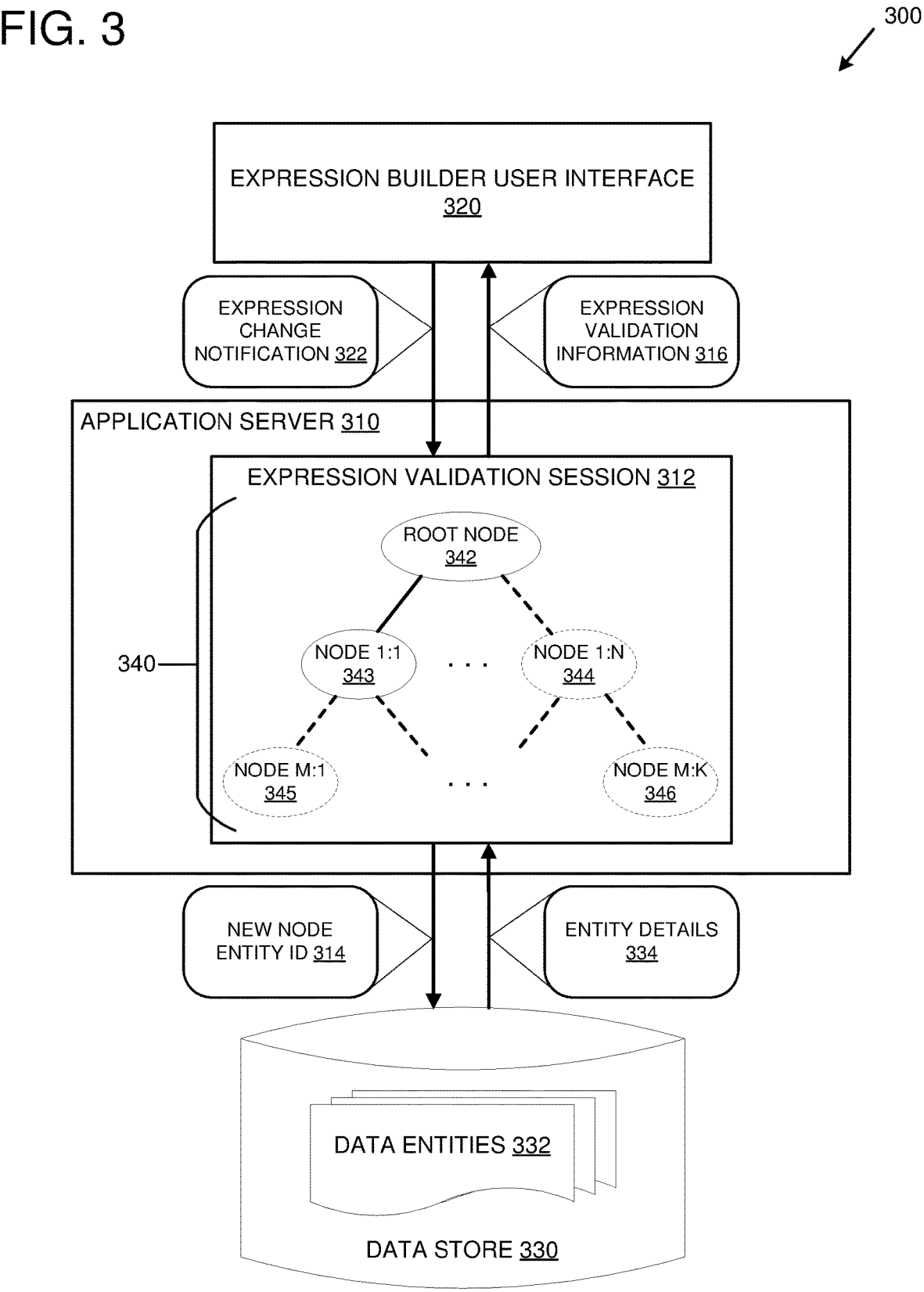
FIG. 3 is a system diagram depicting an example system for validating expression changes using an expression tree and a database.

FIG. 3 is a system diagram depicting an example system 300 for validating expression changes using an expression tree 340 in an expression validation session 312, and a database 330. The example system 300 comprises an expression builder user interface 320, an application server 310, and the database 330.

The expression builder user interface 320 is configured to detect a change made to an expression and to transmit an expression change notification 322, comprising the detected expression change, to the expression validation session 312 on the application server 310. The expression builder user interface 320 transmits the expression change notification 322 via a bidirectional communication channel connecting the expression builder user interface 320 and the expression validation session 312. In at least some embodiments, the expression builder user interface 320 can be part of a client computing device (not shown) connected to the application server 310 by a computer network.

The expression validation session 312 can use the expression tree 340 to construct a representation of the expression using expression change notifications (e.g., 322) received from the expression builder user interface 320. The expression tree 340 comprises nodes (e.g., 342-343) that represent different portions of the expression. A parent-child relationship between two nodes in the expression tree 340 can indicate that the child node is an operand or parameter of the parent node. For example, the node 343 can be an operand or parameter of the node 342. A node in the expression tree 340 can have one or more child nodes. For example, the root node 342 can have one or more child nodes 343-344. Similarly, the node 343 can have one or more child nodes (e.g., 345), the node 344 can have one or more child nodes 346, etc.

The expression validation session 312 can recreate the expression using the expression tree 340 by traversing the nodes of the tree to build the expression piece-by-piece. The expression validation session 312 can update the expression tree 340 using the expression change included in the expression change notification 322. In at least one embodiment, the expression change notification 322 describes an update made to the expression and a position where the update was made in the expression, relative to other portions of the expression. In such an embodiment, the position information can be used by the expression validation session 312 to locate a node in the expression tree 340 associated with a portion of the expression where the change was made. The expression validation session 312 can then modify the located node, and/or add one or more sub-nodes to the located node, to represent the expression change.

In some embodiments, the updated expression tree 340 can be used to determine whether the changed expression is syntactically valid. For example, the expression validation session 312 can traverse the updated expression tree 342 to determine whether the updated expression tree 340 is a valid expression tree. In at least some cases, if the updated expression tree 340 is a valid expression tree, then the expression validation session 312 can conclude that the expression change resulted in a syntactically valid expression.

In a scenario where one or more nodes are added to the expression tree 340 to represent the expression change, the expression validation session 312 can analyze the added one or more nodes to determine if any of the added nodes contain entity identifiers. In at least one embodiment, an added node that is a leaf node can be interpreted as being associated with an entity identifier. For example, non-leaf nodes can be interpreted as representing functions and/or operations that have one or more parameters and/or operands represented by their child nodes. Whereas, a leaf node can be interpreted as an entity identifier or a literal value. In a different or further embodiment, nodes in the expression tree 340 can comprise node type identifiers that indicate what type of expression component (e.g., function, operation, value, entity identifier, etc.) they each contain. In such an embodiment, a newly added node with a node type identifier that indicates that it contains an entity identifier can be selected. Such node type identifiers can be added to the expression tree nodes as part of the node creation process. For example, the expression validation session 312 can parse an expression change using a programming language syntax grammar in order to determine the various identifiers (operator identifiers, keyword identifiers, entity identifiers, literal value identifiers, etc.) included in the expression change.

If the expression validation session 312 detects an entity identifier in a newly added expression tree node, the expression validation session 312 can transmit the entity identifier as part of a message 314 to the database 330 to determine if one of data entities 332 is associated with the entity identifier. If a data entity is associated with the entity identifier, the database 330 transmits a message 334 containing details about the identified entity to the expression validation session 312. If no entity was found, the message 334 can contain a value indicating that no match was found.

The expression validation session 312 can transmit a response message 316 to the expression builder user interface 320 via the bidirectional communication channel. The response message 316 comprises validation information pertaining to the expression change included in the expression change notification 322. The expression change information can include information pertaining to the syntactic validity of the expression change and/or the validity of any entity identifiers included in the expression change. The expression builder user interface 320 can update a displayed representation of the expression to indicate the validity or invalidity of the expression change.

Figure 4:
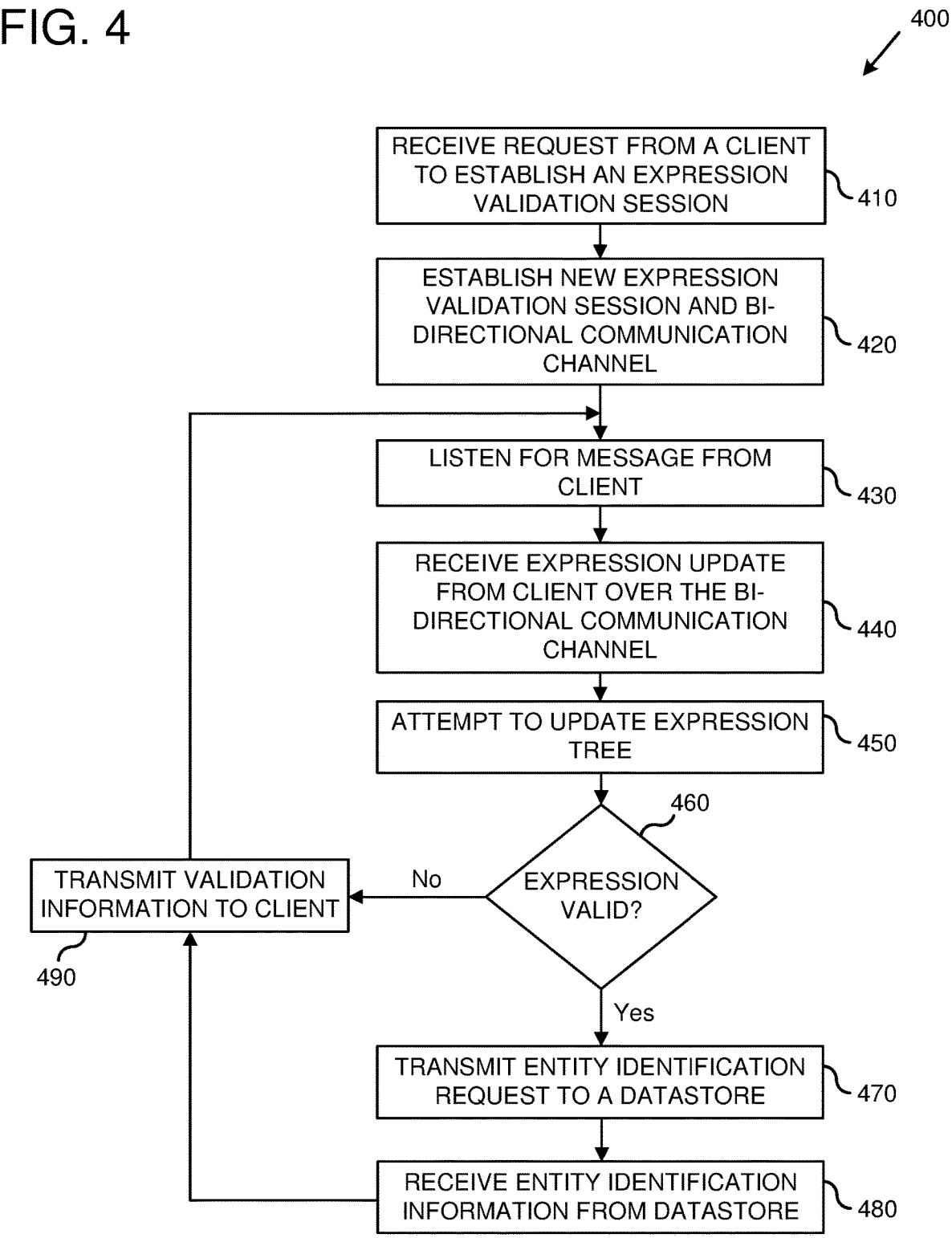
FIG. 4 is a flowchart depicting an example method for validating expression updates using an expression validation session.

FIG. 4 is a flowchart depicting an example method 400 for validating expression updates using an expression validation session. Any of the example systems described herein can be used to perform the example method 400.

At 410, a request is received from a client to establish an expression validation session. In at least some embodiments, the client can be a computing device comprising a user interface component for creating and/or editing an expression. In such an embodiment, the client can be configured to transmit the request to establish an expression validation session when the user interface component is loaded, but before allowing a user to edit the expression. In a particular embodiment, the request to establish an expression validation session comprises a request to create a connection to a socket supporting bidirectional communication.

At 420, a new expression validation session is created. Creating the new expression validation session can include creating an empty expression tree and storing the empty expression tree in a memory or storage associated with the expression validation session. The expression validation session, in at least some cases, is associated with a session identifier that is provided to the client. In such cases, the client can provide the session identifier in subsequent requests in order to identify the expression validation session with which the client's requests should be processed. Additionally, a new bidirectional communication channel can be established with the client. Optionally, the bidirectional communication channel can be associated with the expression validation session. In at least some cases where the bidirectional communication channel is associated with the expression validation session, it may not be necessary to provide a session identifier, as all transmissions across the bidirectional communication channel may be implicitly associated with the expression validation session. Alternatively, providing the session identifier to the client can allow multiple expression validation sessions to be supported with the client using a single bidirectional communication channel, since transmissions for the multiple expression validation sessions can be distinguished from one another using the different session identifiers.

In a scenario where a user interface component of the client is being used to edit an existing expression, the client can provide the existing expression as part of the request to establish an expression validation session at 410 (or as part of a separate transmission via the bidirectional communication channel). The existing expression can be parsed to generate expression tree nodes that can be used to populate the empty expression tree associated with the new expression validation session.

At 430, a process configured to receive messages from the client listens for a message to arrive over the bidirectional communication channel. At 440, an expression update is received from the client over the bidirectional communication channel. The expression update can be transmitted by the client in response to detecting a modification made to the expression by a user of the client. The client can transmit the expression update asynchronously using the bidirectional communication channel, as the user continues to modify the expression. The expression update can comprise a description of the detected change made to the expression. For example, the expression update can comprise an updated portion of the expression and a position within the expression where the updated portion is located. Additionally or alternatively, the expression update can include an identifier associated with a node in the expression tree, wherein the expression tree node is associated with the portion of the expression that was updated. In such an embodiment, when an update is made to the expression tree, a representation of the updated expression tree may be transmitted to the client via the bidirectional communication channel. The client can retain the representation of the updated expression tree and use it to correlate portions of the expression with their associated expression tree nodes.

At 450, an attempt is made to update the expression tree associated with the expression validation session. The description of the detected change included in the expression update can be evaluated to identify a node in the expression tree associated with the portion of the expression in which the change was detected. In a case where the expression tree is empty, the updated (i.e., newly added) portion of the expression can parsed to generate one or more expression tree nodes, which can then be added as a root node (optionally with one or more child nodes) of the expression tree. In a scenario where the expression tree is not empty, an existing node in the expression tree can be located that is associated with the position in the expression where the expression update was made. The changed portion of the expression included in the expression update can be parsed to generate one or more expression tree nodes that can be added as child nodes of the existing node.

At 460, it is determined whether the expression update resulted in a valid expression using the expression tree. The expression tree can be traversed to determine whether the expression, including the expression update, is syntactically valid. If the expression is not syntactically valid, then it can be determined that the expression update did not result in a valid expression. Alternatively, if the expression is syntactically valid it can be determined that the expression update resulted in a valid expression.

Additionally or alternatively, in some cases the attempt to update the expression tree at 450 can be unsuccessful. For example, it may not be possible to successfully parse the changed portion of the expression, or it may not be possible to form one or more valid expression tree nodes using the parsed changed portion of the expression. In such cases, it can be determined at 460 that the expression change did not result in a valid expression.

If the expression update did not result in a valid expression, then at 490 validation information is transmitted to the client via the bidirectional communication channel, indicating that the expression update is invalid.

However, if the expression tree was successfully updated, and resulted in a syntactically valid expression, then at 470 an entity identification request is transmitted to a data store containing one or more entity definitions. The newly added expression tree nodes can be analyzed to determine if one of them contains an entity identifier. If one of the nodes does contain an entity identifier, the entity identification request is transmitted to the data store in order to determine whether an entity defined in the data store is associated with the entity identifier. At 480, entity identification information is received from the data store in response to the request. If an entity was located in the data store associated with the entity identifier, then the entity identification information can include details about the identified entity (such as a fully qualified name, a unique identifier, access permissions, etc.). However, if no entity was located, the entity identification information can comprise a message indicating that no entity associated with the provided identifier is defined. In at least some embodiments, if an exact match between the provided entity identifier and an identifier associated with an entity defined in the data store could not be made, the entity identification information can include one or more suggestions of possible entity identifiers that are similar to and/or that contain the provided entity identifier.

At 490, validation information is transmitted to the client by the bidirectional communication channel. The validation information can comprise a value indicating whether or not the expression update is valid. If the expression update is not valid, the validation information can include a description explaining why it was determined at 460 that the expression update did not result in a valid expression. If the expression was determined to be valid at 460, then the validation information can include an entity identifier detected in the changed portion of the expression and a value indicating whether or not the entity identifier is valid. The validation information can indicate that the entity identifier is not valid if no entity associated with the entity identifier was found in the data store. The validation information can indicate that the entity identifier is valid if an entity associated with the entity identifier was found in the data store.

In an embodiment where the entity identification information received from the data store at 480 included one or more suggestions of possible entity identifiers, the possible entity identifiers can be included in the validation information transmitted to the client at 490.

After the validation information is transmitted to the client at 490, control returns to 430 to listen for another expression update message from the client. If a subsequent expression update message was received from the client while one or more of 430-490 were being performed, the subsequent expression update message can be buffered and retrieved from the buffer for processing when control returns to 430.

Example 6—Example Expression Update Validation Session

In any of the examples described herein, a system can be provided for validating successive changes to an expression using an expression validation session.

Figure 5:
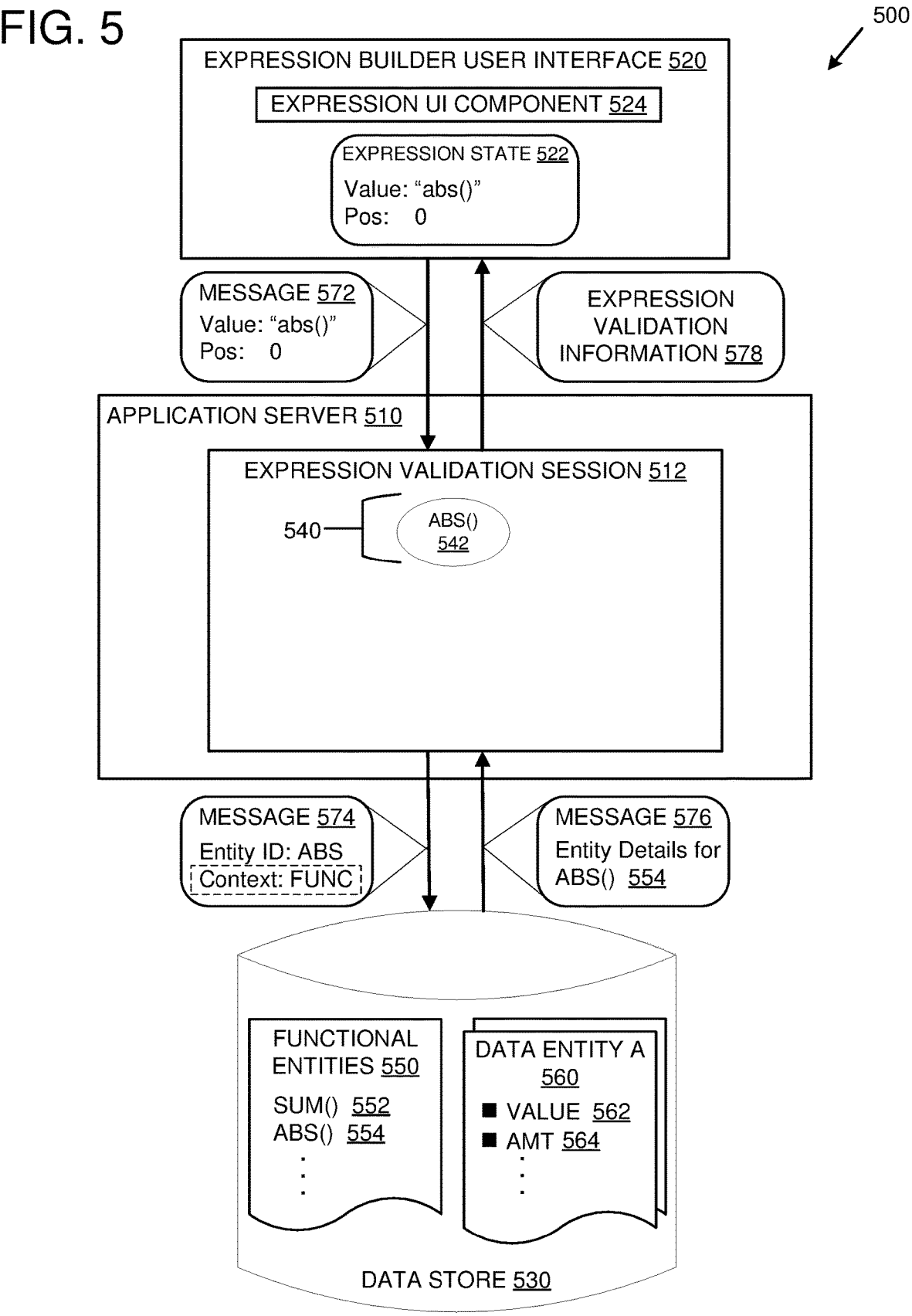
FIGS. 5-8 are system diagrams depicting an example system for validating successive updates to an expression using an expression validation session.

FIG. 5 is a system diagram depicting an example system 500 for validating successive updates to an expression using an expression validation session 512. The example system 500 comprises an expression builder user interface 520 comprising an expression user interface component 524, an application server 510 comprising an expression validation session 512, and an entity data store 530 comprising definitions for functional entities 550 and one or more data entities (e.g., 560).

The expression builder user interface 520 is configured to display the expression user interface component 524 and to enable a user to interact with the expression user interface component 524. The expression user interface component 524 is configured to display a representation of an expression and to enable a user to make modifications to the expression. The expression builder user interface 520 further comprises an expression state 522 that includes a value of the expression currently displayed in the expression user interface component 524 and a position in the expression where a detected change to the expression was made.

The expression builder user interface 520 is further configured to detect changes made to the expression in the expression user interface component 524 and to transmit expression change messages comprising the detected changes (e.g., 572) to the expression validation session 512 in the application server 510 over a bidirectional communication channel. The expression validation session 512 is configured to receive the messages from the expression builder user interface 520 over the bidirectional communication channel and to validate the detected changes to the expression.

Validating a detected change to the expression can comprise modifying an expression tree 540 based on the detected change, detecting an entity identifier in the modified expression tree, transmitting a message (e.g., 574) to the data store 530 to verify the existence of an entity in the data store 530 associated with the detected entity identifier, and receiving a response message (576) from the data store 530 indicating whether an entity associated with the entity identifier exists in the data store 530. The expression validation session 512 is further configured to transmit expression validation information (e.g., 578) to the expression builder user interface 520 over the bidirectional communication channel, wherein the expression validation information indicates whether a corresponding expression change (such as the expression change included in the message 572) includes an entity identifier associated with an entity defined in the data store 530.

By way of example, FIG. 5 depicts the expression state 522 as including a value "abs( )" that is a current value of the expression displayed in the expression user interface component 524, and a position value indicating a position in the expression where a change has been detected. In this particular scenario an initial value of "abs( )" has been entered into the expression user interface component 524. The expression builder user interface 520 detects the change to the expression and updates the value in the expression state 522 to reflect the newly added value "abs( )" A position value of 0 may be used to indicate that the detected change to the expression occurred at the beginning of the expression. Such a value may be used in cases where the detected change is the first value entered to create a new expression in the expression user interface component 524. The example position values provided herein are provided for illustration purposes and are not intended to be limiting. Other position value schemes are possible.

The expression builder user interface 520 transmits the detected change to the expression (in this case the entire current value of the expression) and the position value as part of the message 572 to the expression validation session 512. The expression validation session 512 parses the change value included in the message 572 and detects that the change value includes a single entity identifier: "ABS." The expression validation session 512 updates the expression tree 540 by adding a new node 542 to the expression tree 540 containing the entity identifier, "ABS," detected in the change to the expression. In this particular case, the expression is a new expression, so the expression tree 540 does not contain any previous expression tree nodes. The new node 542 is be added as a root node of the expression tree 540. Additionally or alternatively, the position value of zero can correspond to the root node of the expression tree 540, and can indicate that the detected change to the expression should be applied at the root level of the expression tree.

The expression validation session 512 transmits the message 574 to the data store 530, including the detected entity ID in the new expression tree node 542. Optionally, the message can include an entity context that can be used to narrow the scope of an entity search performed by the data store 530. For example, when the detected change is parsed, it can be determined (e.g., by using a syntax grammar) that the entity identifier is an identifier for a functional entity. In such a scenario, a context value of "FUNC" (or some other value) may be provided as part of the message 574. The data store 530 can detect the provided context value and limit the scope of the entity search to the functional entities 550 stored in the data store 530.

After receiving the message 574, the data store 530 searches entities defined in the data store for an entity associated with the provided entity identifier. In this particular scenario, the data store 530 detects that a functional entity 554 is associated with the provided entity identifier "ABS." The data store 530 transmits entity details for the entity 554 to the expression validation session 512. The entity details include an indicator that an entity associated with the provided identifier (i.e., 554) was found in the data store 530. The expression validation session 512 can transmit the expression validation information 574 to the expression builder user interface 520 via the bidirectional communication channel. In this particular scenario, the expression validation information 578 can indicate that the detected expression change is valid since the detected entity identifier, "ABS," is associated with an entity defined in the data store 530. In at least one embodiment, the expression validation information 578 includes one or more of the entity details for the entity 554 returned in the message 574 from the data store 530. For example, the expression validation information 578 can include the detected entity identifier, a value indicating that the detected entity is a functional entity, a position value associated with the new expression node 542, and/or an identifier associated with the new expression node 542.

Figure 6:
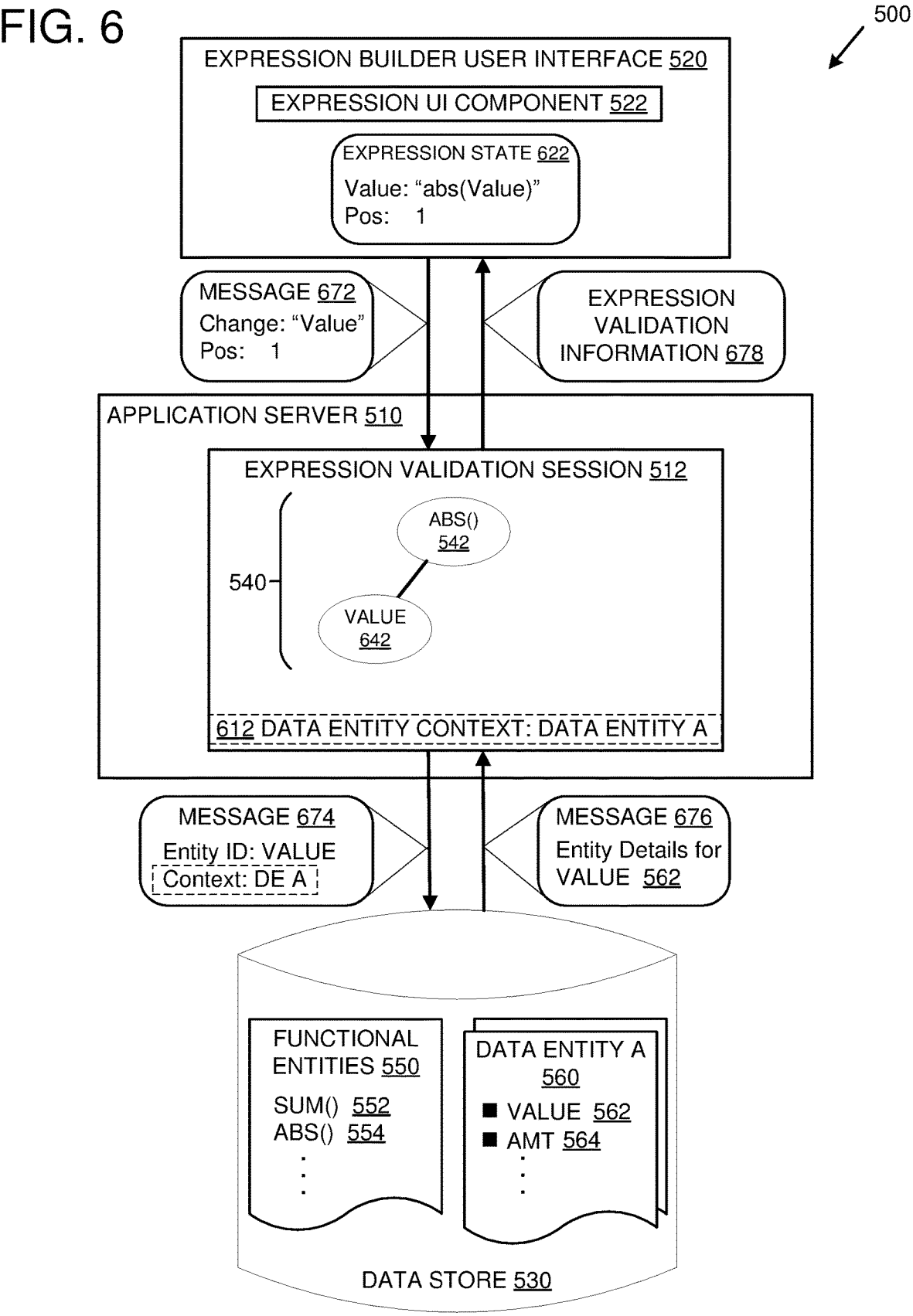

FIG. 6 is another system diagram depicting the example system 500 for validating successive updates to an expression using the expression validation session 512. In the scenario depicted in FIG. 6, the expression has been modified in the expression user interface component 522 to include an identifier, "Value," as a parameter of the abs( ) function. The expression builder user interface 520 detects the change and updates and expression state 622 with a current value of the expression and a position value indicating where the detected change was made in the expression. In this particular example, a position value of 1 is used to indicate that the change was detected within the first portion of the expression. For example, based on the previously received expression validation information 578, the expression builder user interface 520 can determine that the portion of the expression, "abs( )" represents a defined functional entity that is associated with a root node 542 of the expression tree 540. The expression builder user interface 520 can determine that the detected change modifies the expression by adding a new string of characters, "Value," within the parenthetical operators of the "abs( )" functional entity and can set the position value to 1 to indicate that the detected change (an addition of the string "Value") was detected within the first portion of the expression (i.e., the "abs( )" functional entity identifier).

The expression builder user interface 520 can transmit the detected change, "Value," and the change position value, 1, to the expression validation session 512 as part of a message 672 via the bidirectional communication channel. The expression validation session 512 can receive the message 672 and can update the expression tree 540 based on the detected change. In this particular scenario, the expression validation session 512 parses the detected change and determines that the detected change comprises a single entity identifier: "VALUE." The expression validation session 512 can evaluate the position value to determine that a new expression tree node 642 should be added as a child of the expression tree node 542 corresponding to the updated portion of the expression.

The expression validation session 512 can transmit a message 674 to the data store 530 including the detected entity identifier, "VALUE." Optionally, the expression validation session 512 can include a data entity context 612 that can indicate a particular data entity (or set of data entities) to be used to limit the scope of the entity search conducted by the data store 530. If the data entity context 612 is present, the value of the data entity context 612 can be included in the message 674. For example, the data entity context 612 can comprise an identifier for a data entity (e.g., "DATA ENTITY A"). Including the value of the data entity context 612 in the message 674 to the data store 530 can limit the scope of the entity search to data fields (e.g., 562-564) defined on the data entity 560 associated with the identifier "DATA ENTITY A."

The data store 530 searches for an entity definition associated with the detected entity identifier, "VALUE," and matches the detected entity identifier to the data field 562. The data store 530 transmits the message 676 to the expression validation session 512, including entity details for the matched data field entity 562. The expression validation session 512 then transmits expression validation information 678 to the expression builder user interface 520. In this particular scenario, the expression validation information 678 comprises a value indicating that the detected change to the expression is valid. Expression validation information 678 can further comprise the detected entity identifier, a value indicating that the detected entity is a data field entity, a position value associated with the new expression node 642, and/or an identifier associated with the new expression node 642.

Figure 7:
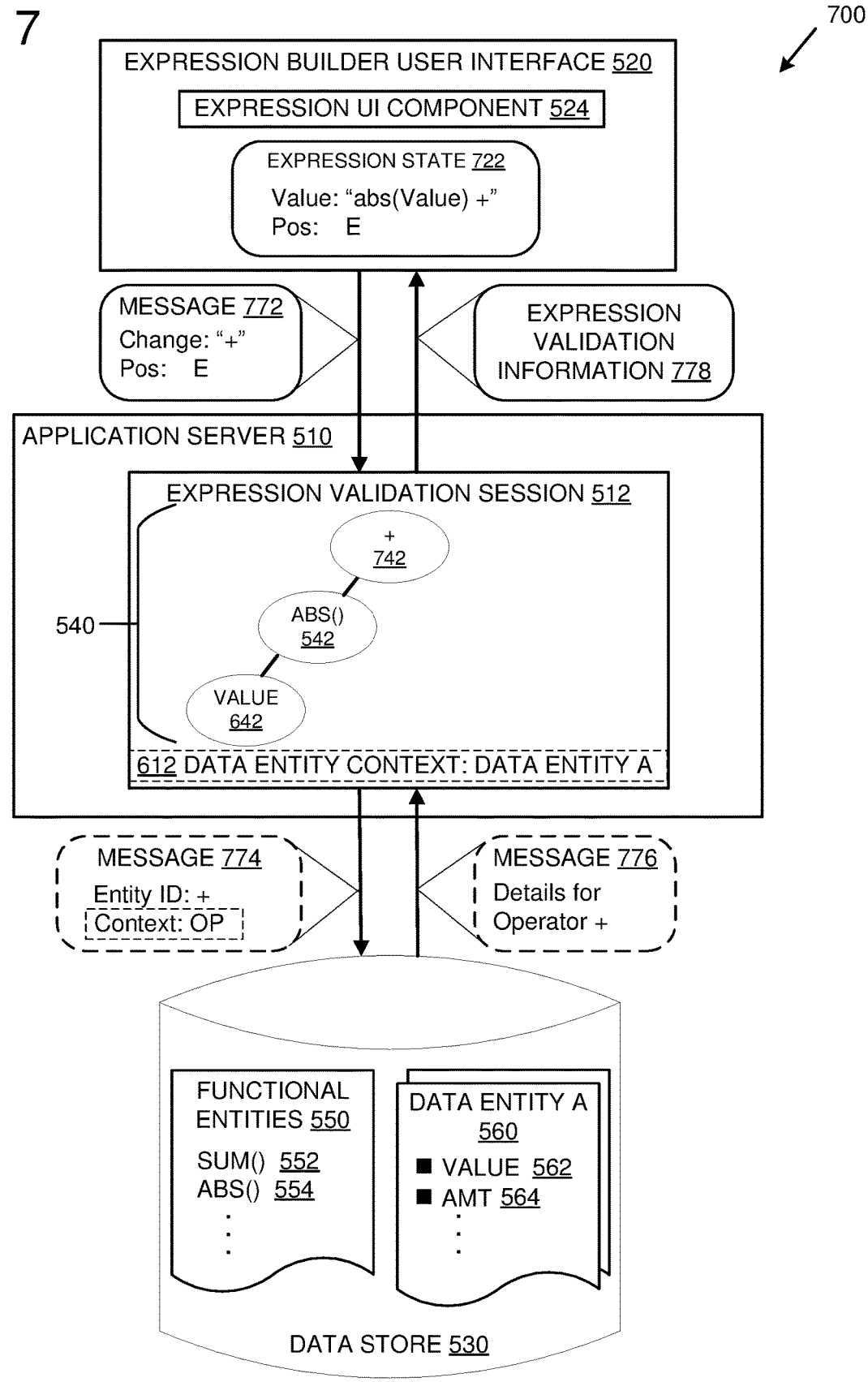

FIG. 7 is another system diagram depicting the example system 500 for validating successive updates to an expression using the expression validation session 512. In the scenario depicted in FIG. 7, the expression builder user interface 520 detects that a character, "+," has been added to the end of the expression in the expression user interface component 524. The expression builder user interface 520 updates an expression state 722 to include the current value of the expression and a position value indicating that the detected change was made at the end of the expression. Alternatively or additionally, the position value can indicate that the detected change was made to the right of the first portion of the expression.

The expression builder user interface 520 transmits a message 772, including the detected change and the position value, to the expression validation session 512. The expression validation session 512 can parse the detected change and determine that the detected change comprises a single identifier: "+." The expression validation session 512 can determine (for example by using a programming language syntax grammar) that the identifier is associated with an arithmetic operator (such as an addition operator). Using the provided position value, the expression validation session 512 can determine that the first portion of the expression is an operand for the arithmetic operator. The expression validation session 512 can locate the expression tree node 542 in the expression tree 540 that is associated with the head of the first portion of the expression. The expression validation session 512 can create a new expression tree node 742 containing the detected arithmetic operator identifier and can make the expression tree node 542 a child of the new expression tree node 742. In this particular case, this has the effect of making the new expression tree node 742 a new root node of the expression tree 540.

The expression validation session 512 can evaluate the updated expression tree 540 to determine whether it results in a syntactically valid expression. In this particular case, the expression validation session 512 can determine that the arithmetic operator associated with the operator identity in the expression tree node 742 requires two operands. Since the node 742 has only one child node (and thus only one operand), the expression validation session 512 can determine that the expression is not syntactically valid.

In at least one embodiment, since the expression is not syntactically valid, the expression validation session 512 transmits expression validation information 778, indicating that the expression is not syntactically valid, without attempting to verify the existence of any entity in the data store 530.

In a different or further, the expression validation session 512 can transmit a message 774 to the data store 530, comprising the detected operator identifier. Optionally, the message 774 can include a context value indicating that the identifier is associated with an operator to limit the scope of the search conducted by the data store 530 to operator definitions. The data store 530 can search for an entity associated with the operator identifier and can return a message 776 with details pertaining to an operator definition if one is found in the data store 530. This can be useful in a scenario where the expression validation session 512 is not able to determine whether the detected identifier is associated with an operator or an entity. For example, details about operators that can be used in the expression may be stored in the data store 530 instead of (or in addition to) a programming language syntax grammar. In such a scenario, the message 776 can include information retrieved from the operator definition, such as an operator type (e.g., arithmetic operator), a minimum number of supported operands, a maximum number of supported operands, one or more supported operand data types, etc. In such a scenario, the expression validation session 512 can use the information retrieved from the operator definition to make a determination as to whether the updated expression tree 540 represents a syntactically valid expression.

The expression validation information 778 can include an updated description of modified portions for the expression. For example, the expression validation information 778 can indicate that the "+" character represents a second portion of the entity expression. In at least some embodiments, the expression validation information 778 comprises a representation of the expression tree 540, comprising associations between nodes in the expression tree 540 and identified portions of the expression.

Figure 8:
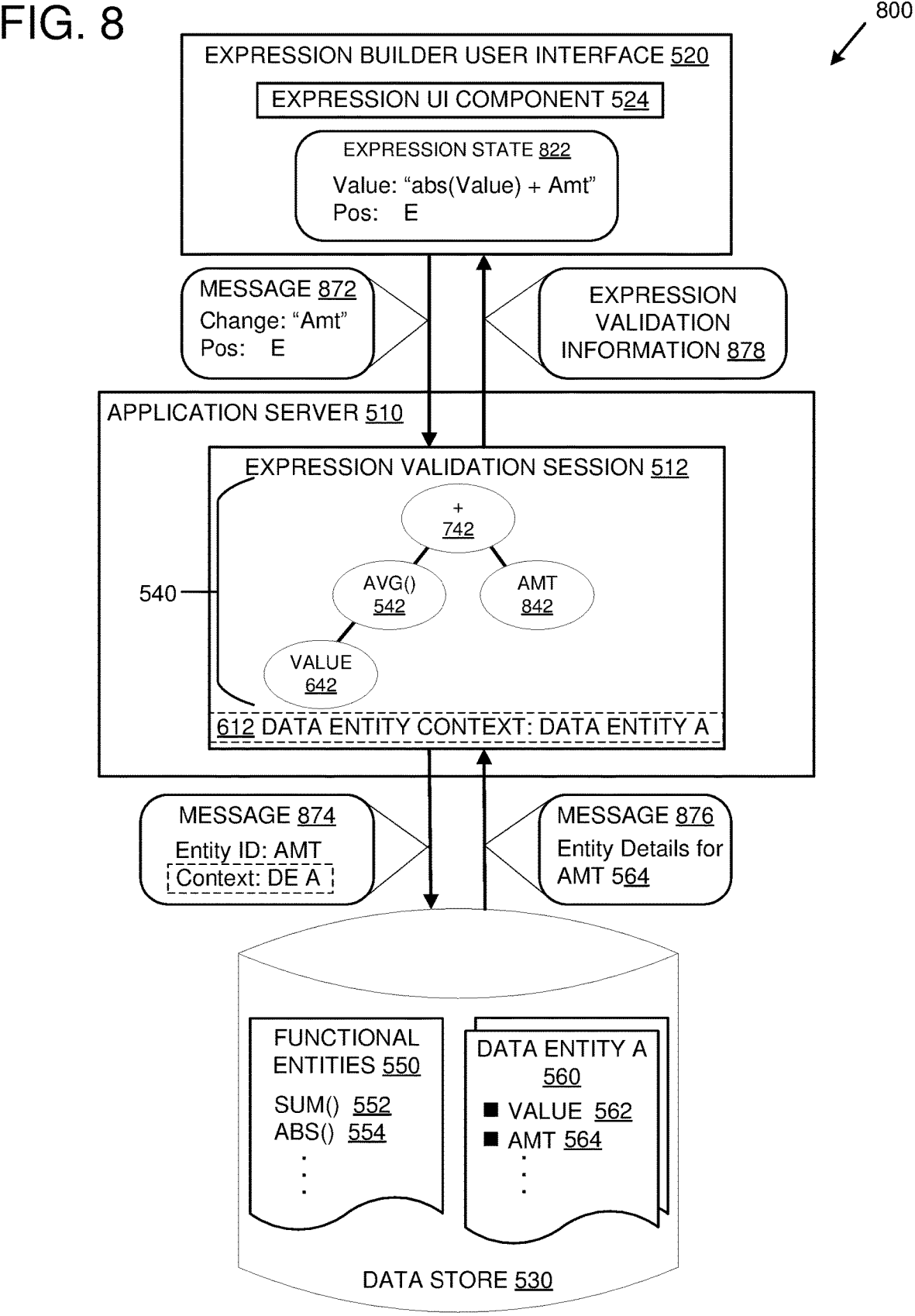

FIG. 8 is another system diagram depicting the example system 500 for validating successive updates to an expression using the expression validation session 512. In the scenario depicted in FIG. 8, the expression has been modified in the expression user interface component 522 to include an identifier, "Amt," at the end of the expression. The expression builder user interface 520 detects the change and updates an expression state 822 with a current value of the expression and a position value indicating where the detected change was made in the expression. In this particular example, the position value indicates that the detected change was made at the end of the expression. Alternatively or additionally, the position value can indicate that the detected change was made to the right of the second portion of the expression (i.e., the "+" character).

The expression builder user interface 520 can transmit the detected change, "Amt," and the change position value to the expression validation session 512 as part of a message 872 via the bidirectional communication channel. The expression validation session 512 can receive the message 872 and can update the expression tree 540 based on the detected change. In this particular scenario, the expression validation session 512 parses the detected change and determines that the detected change comprises a single entity identifier: "AMT." The expression validation session 512 can evaluate the position value to determine that a new expression tree node 842 should be added as a child of the expression tree node 742. For example, the expression validation session 512 can determine that the expression tree node 742 is associated with an operator that takes the identifier (or expression portion) immediately following that as an operand, and can add the new expression tree node 842 as a child node of the node 742 to reflect this operator-operand relationship.

The expression validation session 512 can evaluate the updated expression tree 540 to determine whether it represents a syntactically valid expression. In this particular case, the expression validation session 512 can determine that the arithmetic operator associated with the operator identity in the expression tree node 742 requires two operands. Since the expression tree node 742 as two child nodes (542 and 842) representing two operands, the expression validation session 512 can determine that the expression tree 540 represents a syntactically valid expression.

The expression validation session 512 can transmit a message 874 to the data store 530 including the detected entity identifier, "AMT." If the expression validation session 512 includes the data entity context 612, the value of the data entity context 612 can be included in the message 874. For example, the data entity context 612 can comprise an identifier for a data entity (e.g., "DATA ENTITY A"). Including the value of the data entity context 612 in the message 874 to the data store 530 can limit the scope of the entity search to data fields (e.g., 562-564) defined on the data entity 560 associated with the identifier "DATA ENTITY A."

The data store 530 searches for an entity definition associated with the detected entity identifier, "AMT," and matches the detected entity identifier to the data field 564. The data store 530 transmits the message 876 to the expression validation session 512, including entity details for the matched data field entity 564. The expression validation session 512 then transmits expression validation information 878 to the expression builder user interface 520. In this particular scenario, the expression validation information 878 comprises a value indicating that the detected change to the expression is valid. Expression validation information 878 can further comprise the detected entity identifier, a value indicating that the detected entity is a data field entity, a position value associated with the new expression node 842, and/or an identifier associated with the new expression node 842.

The scenarios depicted in FIGS. 5-8 are provided for illustration purposes and are not intended to be limiting.

Example 7—Example Expression Update Authorization

In any of the examples described herein, a system can be provided for determining whether access to an entity identified in an expression update is authorized.

Figure 9:
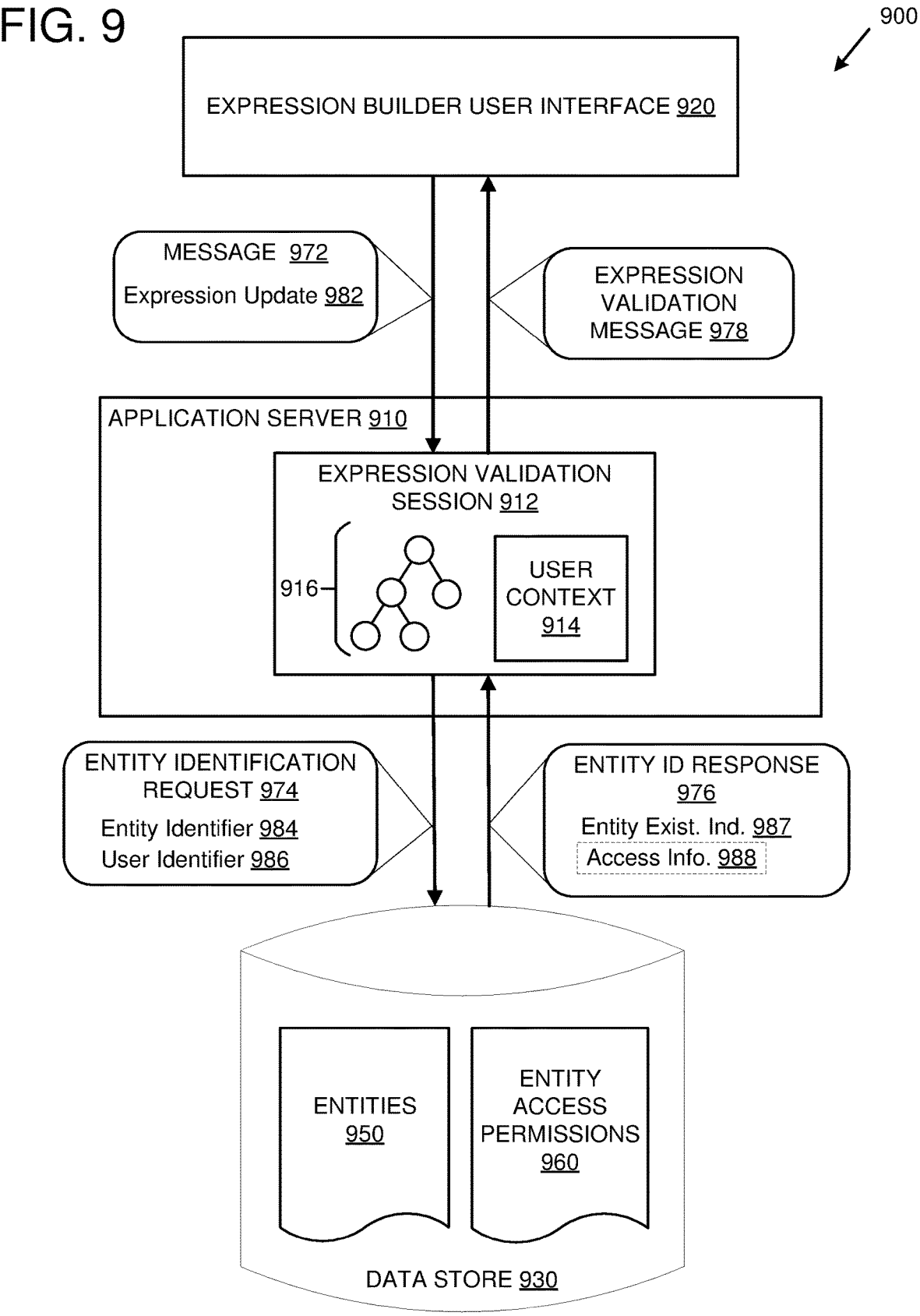
FIG. 9 is a system diagram depicting an example system for validating an expression update using entity access permissions.

FIG. 9 is a system diagram depicting an example system 900 for validating an expression update using entity access permissions 960 stored in a data store 930. The example system 900 comprises an expression builder user interface 920, an application server 910, and a data store 930. The expression builder user interface 920 is configured to detect an update to an expression displayed in the expression builder user interface 920. The expression builder user interface 920 is configured to transmit a message 972 comprising the detected expression update 982 to an expression validation session 912 on the application server 910 via a bidirectional communication channel.

The expression validation session 912 can update an expression tree 916 using the provided expression update 982. Using the updated expression tree 916, expression validation session 912 can determine whether the expression update 982 results in a syntactically valid expression. The expression validation session 912 can analyze updated portions of the expression tree 916 to determine that an expression tree node added as part of the update contains an entity identifier.

The expression validation session 912 comprises a user context 914 that comprises a user identifier for a user associated with the expression validation session 912. In at least some embodiments, the user context 914 can be associated with a user that modified the expression via the expression builder user interface 920. In a different or further embodiment, before being able to edit the expression using the expression builder user interface 920, the user is authenticated and an identifier associated with the user is retrieved from the data store 930 and stored in the user context 914.

The expression validation session 912 transmits an entity identification request 974 to the data store 930. The entity identification request 974 comprises the entity identifier 984 detected in the expression update 982 and the user identifier 986 stored in the user context 914. The data store 930 searches entities 950 stored in the data store 930 for an entity associated with the entity identifier 984. If an entity associated with the entity identifier 984 is found, the data store 930 can search entity access permissions 960 to determine if any of the access permissions 960 are associated with the identified entity. If one or more of the entity access permissions 960 are associated with the identified entity, the data store 930 can evaluate the associated access permissions in conjunction with the user identifier 986 to determine whether the user has permission to access the identified entity. In at least one embodiment, the entity access permissions 960 associate entity identifiers with user identifiers. An entity access permission can indicate that a given user has access to a given entity. Alternatively or additionally, an entity access permission can indicate that a given user does not have access to a given entity.

The data store 930 can transmit an entity identification response 976 to the expression validation session 912. The entity identification response 976 can comprise an entity existence indicator 987, which indicates whether or not an entity associated with the entity identifier 984 was found in the data store 930. Optionally, if an entity associated with the entity identifier 984 is found in the data store 930, and the identified entity is associated with one or more of the entity access permissions 960, the entity identification response 976 can include access information 988. The access information 988 can indicate whether or not the user associated with the user identifier 986 has permission to access the entity associated with the entity identifier 984. In at least some embodiments, if the entity existence indicator 987 indicates that an entity associated with the entity identifier 984 was found, but access information 988 is not included in the entity identification response 976, the expression validation session 912 can conclude that the user associated with user identifier 986 can access the identified entity.

The expression validation session 912 can transmit expression validation message 978 to the expression builder user interface 920 via the bidirectional communication channel. The expression validation message 978 can indicate whether or not the expression update 982 is valid. If the updated expression of syntactically valid, an entity matching the entity identifier was found in the data store 930, and the user associated with the use identifier 986 has permission to access the identified entity, the expression validation message 978 can indicate that the expression update 982 is valid. Additional information about the identified entity, and/or a representation of the updated expression tree 916, can be included in the expression validation message 978.

Otherwise, the expression validation message 978 can indicate that the expression update 982 is invalid. In at least some embodiments, information pertaining to particular reasons why the expression update 982 is invalid can be included in the expression validation message 978. In a different or further embodiment, if an entity associated with the entity identifier 984 was found, but the user associated with the user identifier 986 does not have permission to access the entity, the expression validation message 978 can indicate that no entity was found. This can be advantageous in certain scenarios since the existence of entities in the data store 930 to which a user does not have access will be hidden from the user.

Example 8—Example Expression Builder User Interface

In any of the examples described herein, a system can be provided for validating changes made to an expression in an expression builder user interface as the changes are being made.

Figure 10:
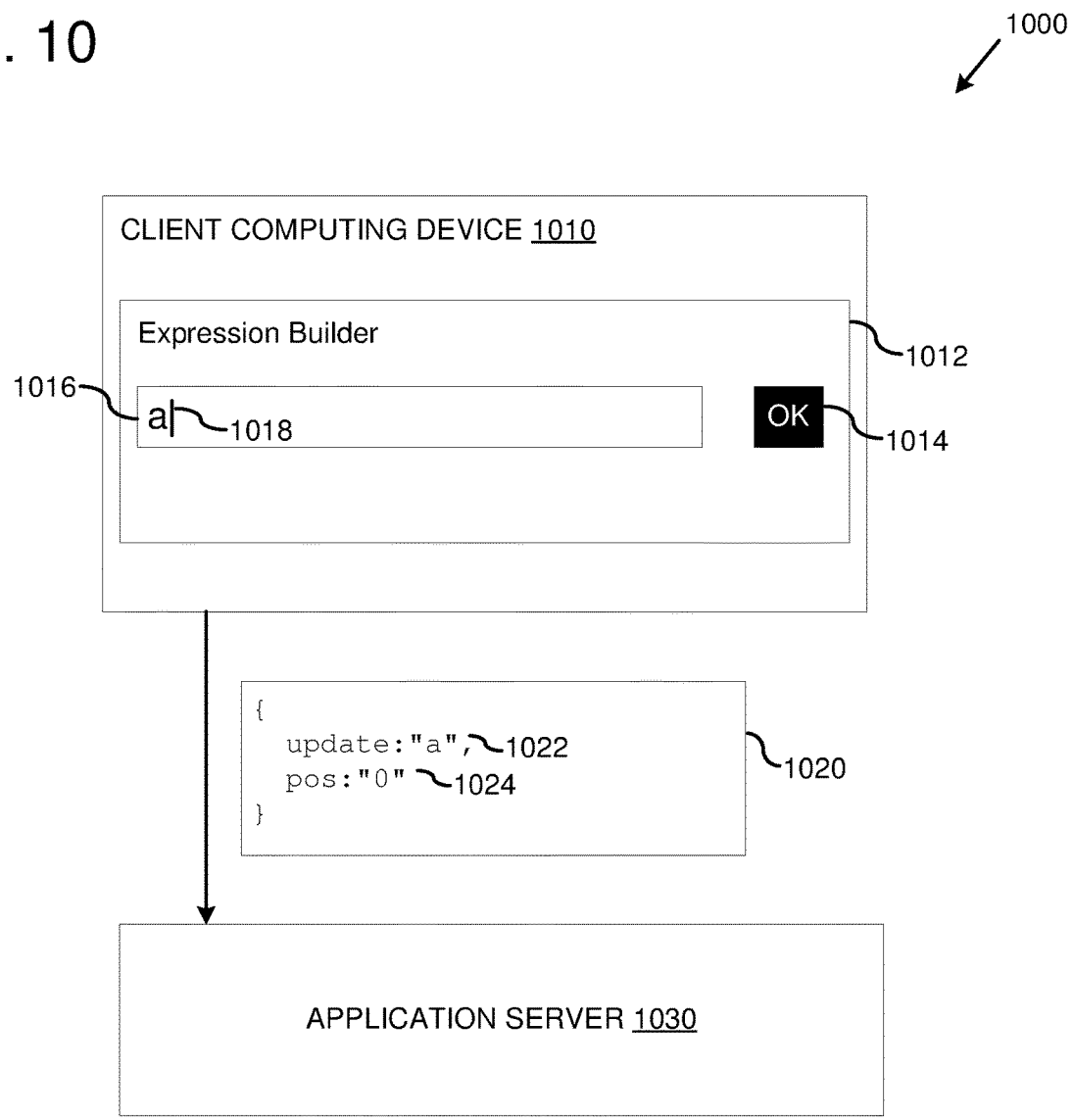
FIGS. 10-17 are system diagrams depicting an example system comprising a user interface for editing an expression with expression update validation.

FIG. 10 is a system diagram depicting an example system 1000 comprising an expression builder user interface 1012 for editing an expression with expression update validation. The example system 1000 comprises a client computing device 1010 that comprises the expression builder user interface 1012. The client computing device 1010 is configured to communicate with an application server 1030 over a bidirectional communication channel.

The expression builder user interface 1012 comprises a textbox 1016 for creating and/or modifying an expression, and a button 1014 that can be used to save changes to an expression being edited in the textbox 1016. The expression builder user interface 1012 can be configured to disable the button 1014 when the textbox 1016 does not contain a valid expression, thus preventing an invalid expression from being saved. For example, in FIG. 10 the textbox 1016 as depicted as including an expression that has not yet been validated and the button 1014 is depicted as being disabled.

A cursor 1018 indicates a current position at which characters can be added and/or removed from the expression via a user input device, such as a keyboard. The client computing device 1010 is configured to detect changes made by the user to the expression in the textbox 1016 and to asynchronously transmit expression update messages (e.g. 1020) to the application server 1030 based on the detected changes.

In at least one embodiment, the bidirectional communication channel between the client computing device 1010 and the application server 1030 can be associated with an expression validation session stored on the application server 1030. In such an embodiment, client computing device 1010 can be configured to transmit a request to the application server 1030 to establish the bidirectional communication channel and create the expression validation session when the expression builder user interface is loaded and/or initialized.

In a scenario depicted in FIG. 10, a user enters a character "a" into the textbox 1016. In this particular scenario, no expression previously existed in the textbox 1016 and the entered character "a" can be interpreted as a beginning of a new expression. The client computing device 1010 can detect the entry of the character "a" in the textbox 1016 and can transmit the expression update message 1020 to the application server 1030 over the bidirectional communication channel. The expression update message 1020 includes the detected update 1022 and a position value 1024 indicating a position in the expression where the change was detected. In this example, a position value of "0" this provided to indicate that the change was detected at the initial position of the expression. Alternatively or additionally, the position value of "0" can indicate that the detected change was detected as the beginning of a new expression.

Figure 11:
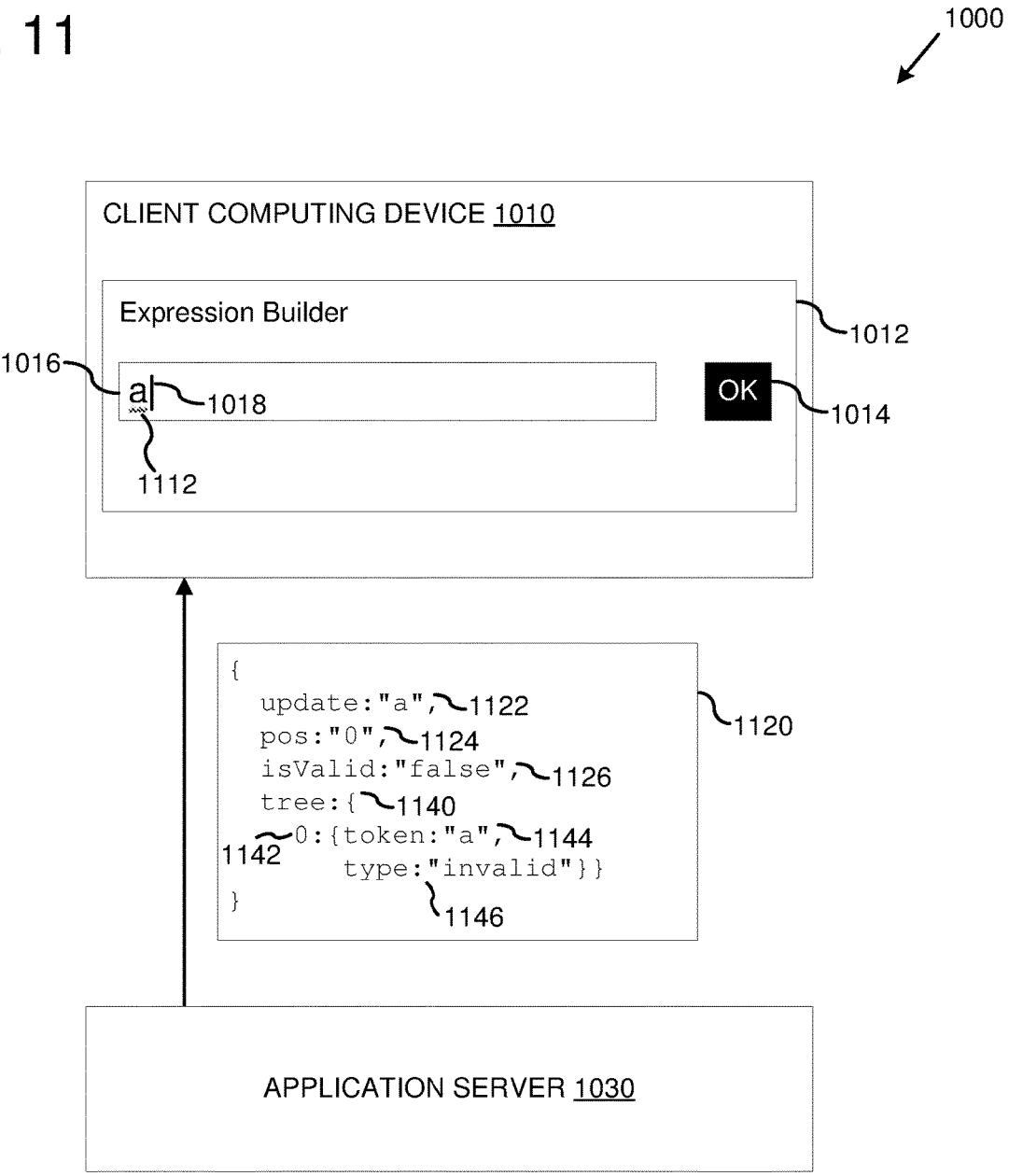

FIG. 11 is another system diagram depicting the example system 1000. In FIG. 11, the application server 1030 is depicted as transmitting an expression update validation message 1120 to the client computing device 1010. The expression update validation message 1120 comprises the detected expression change 1122 and the position value 1124. These values can correspond to the values provided in a corresponding expression update message. For example, the values 1122 and 1124 correspond to the values 1022 and 1024 provided in the expression update message 1020. Since the expression update messages (e.g. 1020) and the expression validation messages (e.g., 1120) are transmitted asynchronously via the bidirectional communication channel, these corresponding values can be used to identify a particular detected change to which a given expression update validation message applies.

The expression update validation message 1120 comprises a value 1126, indicating that the detected expression update is not valid. Expression update validation message 1120 also comprises an expression tree representation 1140 based on the updated expression. The expression tree representation 1140 includes a single member property 1142 representing a root node of the expression tree. The name of the member property "0" can correspond to a position identifier in the expression associated with the root node. Since the detected update in this particular scenario represents the beginning of a new expression, the root node 1142 contains a token value 1144 with a value of the detected character "a." The node 1142 also contains an entity type 1146 that indicates a type of entity that is represented by the token 1144. In this particular example, the entity type 1146 has a value of "invalid," which indicates that a valid entity cannot be found that is associated with the token value 1144.

The client computing device 1010 can inspect the value 1126 to determine that the detected change (i.e., the entry of the character "a") did not result in a valid expression. The expression builder user interface component 1012 can use the updated value 1122, the position value 1124, and the expression tree representation 1140 to identify a portion of the expression in the textbox 1016 that is invalid. Once the invalid portion of the expression is located (in this case the character "a"), the expression builder user interface 1012 can decorate the invalid portion of the expression with a visual indicator 1112 to signal to the user that the decorated portion of the expression is invalid.

Figure 12:
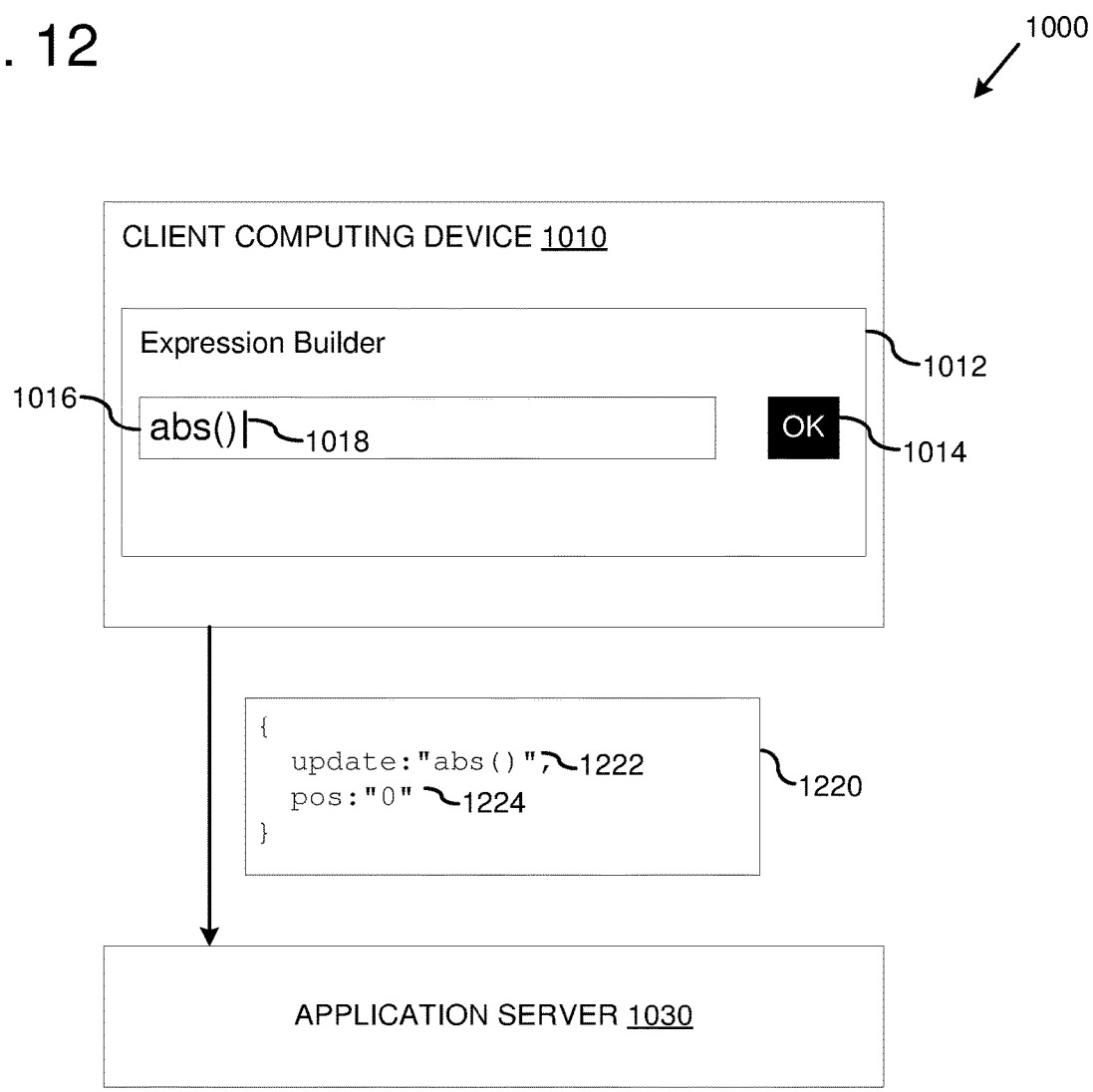

FIG. 12 is another system diagram depicting the example system 1000. In the scenario depicted in FIG. 12, the user has entered additional characters "bs( )" into the textbox 1016. In at least some embodiments, the client computing device 1010 transmits an expression update message to the application server 1030 each time a new character is entered into the textbox 1016. Alternatively, the client computing device 1010 can buffer entered characters and transmit the buffered characters as part of an expression update message when the user stops entering characters.

The client computing device 1010 can use the previously provided expression tree representation 1140 to determine that the detected change was made at the position in the expression with the position identifier "0." The client computing device 1010 can transmit an expression update message 1220 to the application server 1030 comprising the detected change. In this particular scenario, since the expression tree representation 1140 indicates that the current token at the position in the expression with the position identifier "0" is invalid, the client computing device 1010 transmits all characters at the relevant position in the expression as the update value 1222, and provides the position indicator 1224 to indicate that the detected change is a change to the current token at that position.

Figure 13:
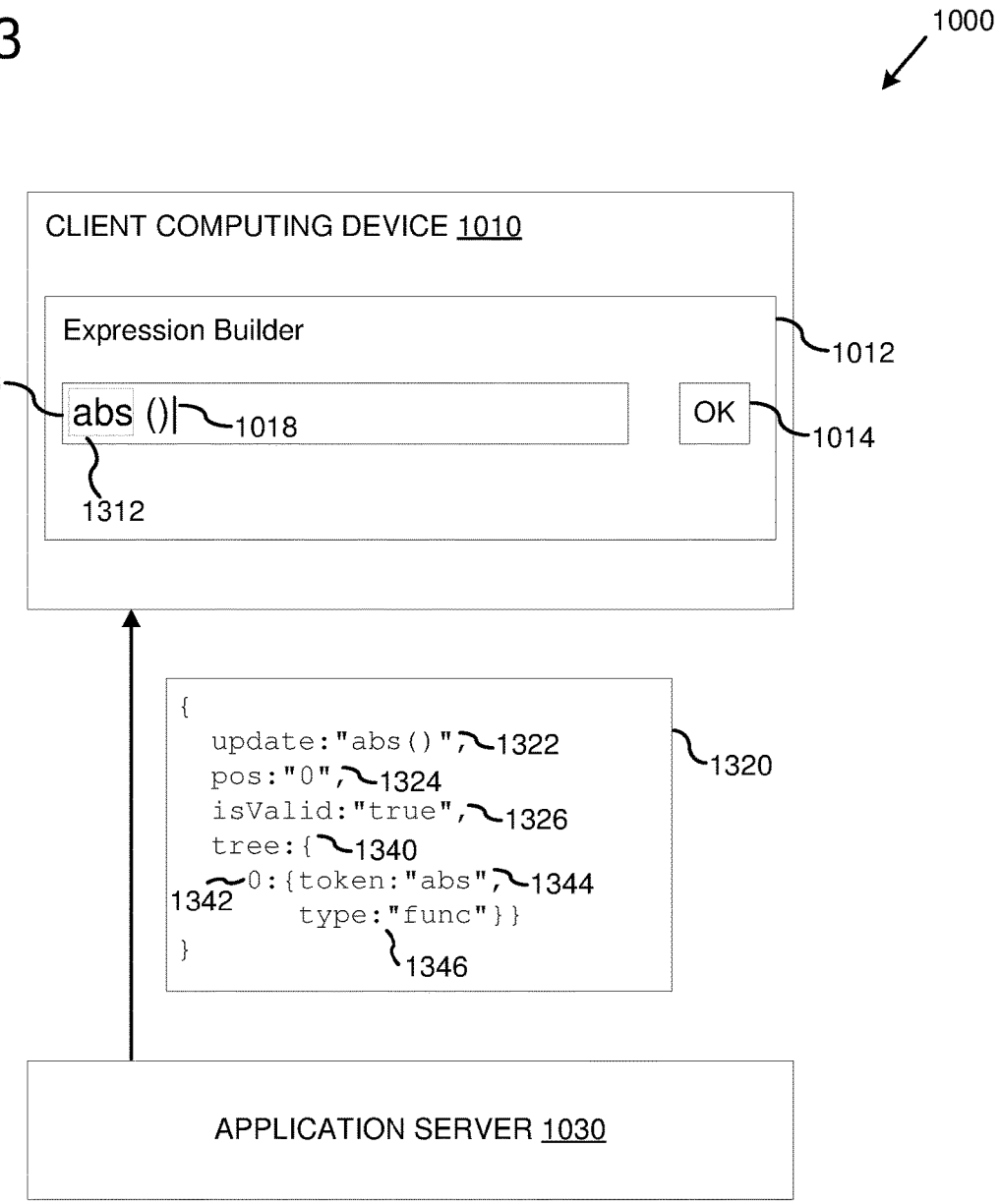

FIG. 13 is another system diagram depicting the example system 1000. In FIG. 13, the application server 1030 is depicted as transmitting an expression update validation message 1320 to the client computing device 1010 in response to the expression update message 1220.

The expression update validation message 1320 includes a value 1326 indicating that the updated expression is valid. Expression update validation message 1320 comprises an updated expression tree representation 1340, which indicates that a root node 1342, corresponding to the position "0," contains a token value 1344. The value "func" of the entity type 1346 indicates that the token 1344 is associated with a valid functional entity.

The client computing device 1010 can inspect the value 1326 to determine that the detected change resulted in a valid expression. The expression builder user interface component 1012 can use the updated value 1322, the position value 1324, and the updated expression tree representation 1340 to identify a portion of the expression in the textbox 1016 that represents a valid entity identifier. Once the valid entity identifier is located (in this case the characters "abs"), the expression builder user interface 1012 can decorate the entity identifier with a visual indicator 1312 to signal to the user that it represents a valid entity.

Since the value 1326 indicates that the expression is valid, the client computing device 1010 can enable the button 1014, thus allowing the user to save the expression. In at least some embodiments, the client computing device 1010 can be configured to keep the button 1014 disabled until expression update validation messages for all transmitted expression update messages have been received and processed.

Figure 14:
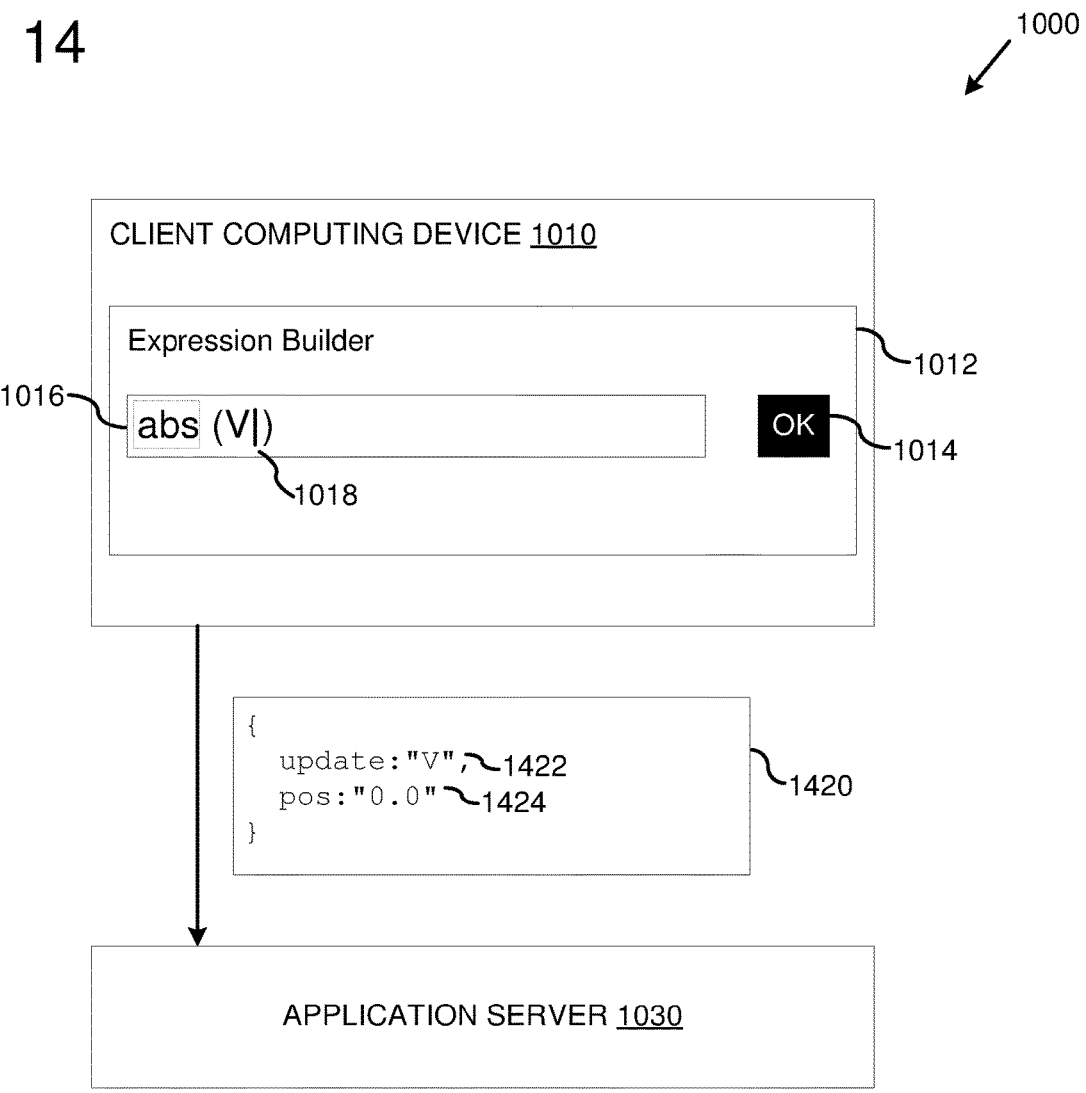

FIG. 14 is another system diagram depicting the example system 1000. In the scenario depicted in FIG. 14, the user has entered an additional character "V" into the textbox 1016. The client computing device 1010 can detect the entry of the additional character, and can use the previously provided expression tree representation 1340 to determine that the detected change was made within the portion of the expression associated with the position "0" (i.e., "abs( )"). Using the previously provided expression tree representation 1340, the client computing device 1010 can determine that the token at position "0" is a functional entity identifier. Since "abs" is a functional entity identifier, the client computing device 1010 can determine that the additional character "V" between the parentheses adjacent to the functional entity identifier is intended to be a parameter of the functional entity, and not a modification of the identifier itself. The client computing device 1010 can transmit an expression update message 1420 to the application server 1030, containing the detected change 1422 and the position within the expression at which the change was detected 1424. Since the detected change is the addition of a character as a parameter of a functional entity at position "0" in the expression, a position indicator value of "0.0" can be provided for the value 1424 to indicate that the value "V" was added as a first child of the expression tree node at position "0."

Figure 15:
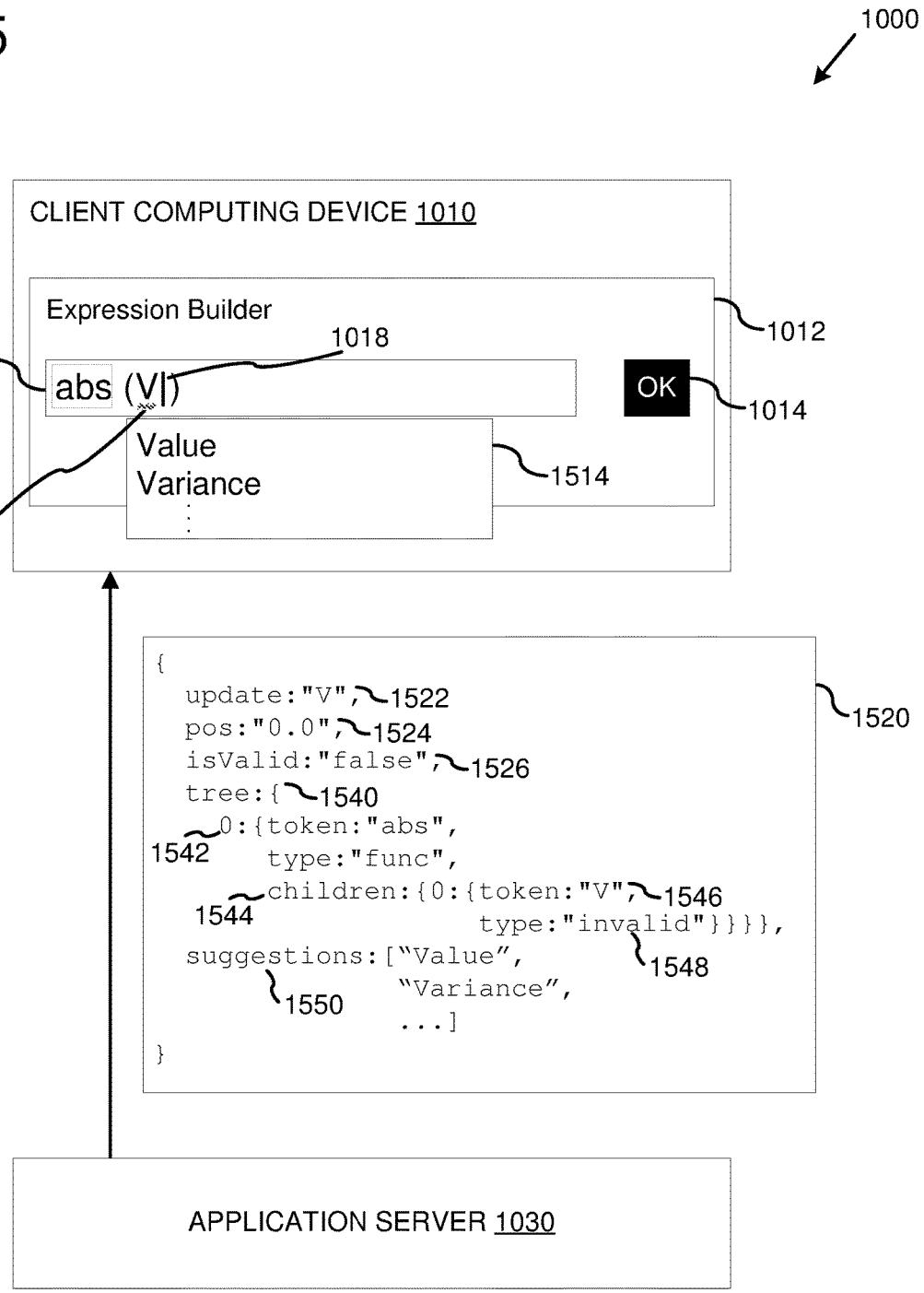

FIG. 15 is another system diagram depicting the example system 1000. In FIG. 15, the application server 1030 is depicted as transmitting an expression update validation message 1520 to the client computing device 1010 in response to the expression update message 1420.

The expression update validation message 1520 includes a value 1526 indicating that the updated expression is invalid. Expression update validation message 1520 comprises an updated expression tree representation 1540, with a root node 1542 corresponding to the position, "0," that contains the token "abs" for the "abs( )" functional entity.

The root node 1542 contains a children property 1544 that represents child nodes of the root node 1544. The children property 1544 contains a single child node that has a token value 1546 of the detected change, "V." The entity type 1548 for the child node has a value of "invalid," indicating that no entity could be found with an identifier that matched the token value 1546, "V."

The expression update validation message 1520 includes a suggestion array 1550 that lists valid entity identifiers which contain, or are similar to, the detected change value of "V."

The client computing device 1010 can inspect the value 1526 to determine that the detected change resulted in an invalid expression. The expression builder user interface component 1012 can use the updated value 1522, the position value 1524, and the updated expression tree representation 1540 to identify a portion of the expression in the textbox 1016 that represents an invalid token (in this case, the character "V"). For example, the client computing device 1010 can parse the position value 1524, "0.0," using the "." character as a delimiter, to obtain an array of two expression node identifiers: "0" and "0." The first node identifier, "0," can be used to retrieve the root node 1542 from the updated expression tree representation 1540. The second node identifier "0" can then be used to retrieve the child node from the children property 1544 of the root node 1542. The client computing device can then use the retrieved expression tree nodes to determine that the character "V" between the parentheses adjacent to the "abs" functional identifier is an invalid token. Once the invalid token is located, the expression builder user interface 1012 can decorate the invalid token with a visual indicator 1512 to signal to the user that it is invalid.

The expression builder user interface 1012 displays the list of suggested entity identifiers 1550 in a drop-down list 1524. In at least some embodiments, the user can select a suggested entity identifier in the drop-down list 1514 to replace the invalid token in the expression with the selected entity identifier.

Since the value 1526 indicates that the updated expression is invalid, the client computing device 1010 can disable the button 1014, thus preventing the user from saving the expression.

Figure 16:
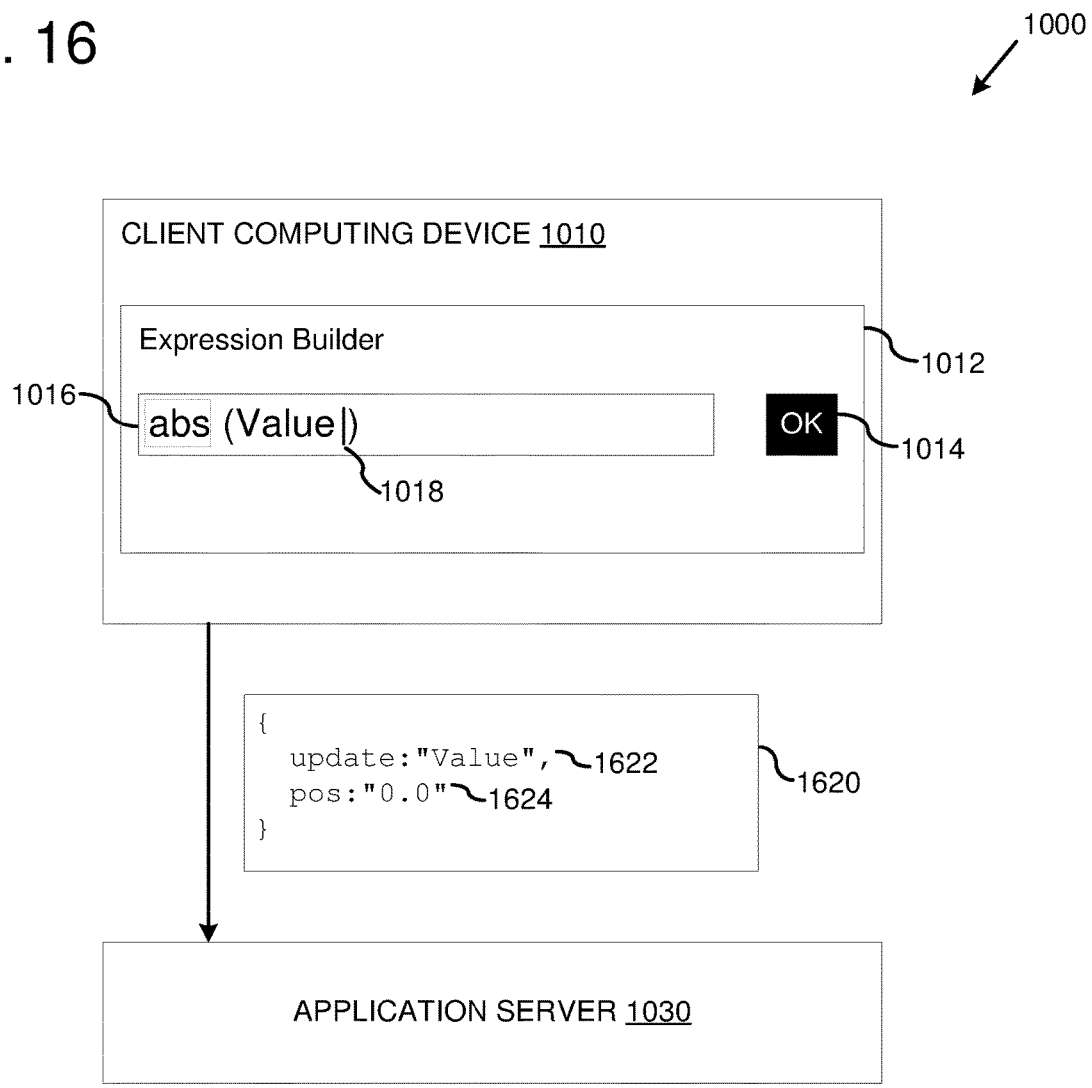

FIG. 16 is another system diagram depicting the example system 1000. In the scenario depicted in FIG. 16, the user has entered additional characters "alue" into the textbox 1016. The client computing device 1010 can use the previously provided expression tree representation 1540 to determine that the detected change was made at the position in the expression with the position identifier, "0.0." The client computing device 1010 can transmit an expression update message 1620 to the application server 1030, comprising the detected change. In this particular scenario, since the expression tree representation 1540 indicates that the current token at the position in the expression with the position identifier "0.0" is invalid, the client computing device 1010 transmits all characters at the relevant position in the expression as the update value 1622, and provides the position indicator 1624 indicating that the detected change is a change to the current token at that position.

Figure 17:
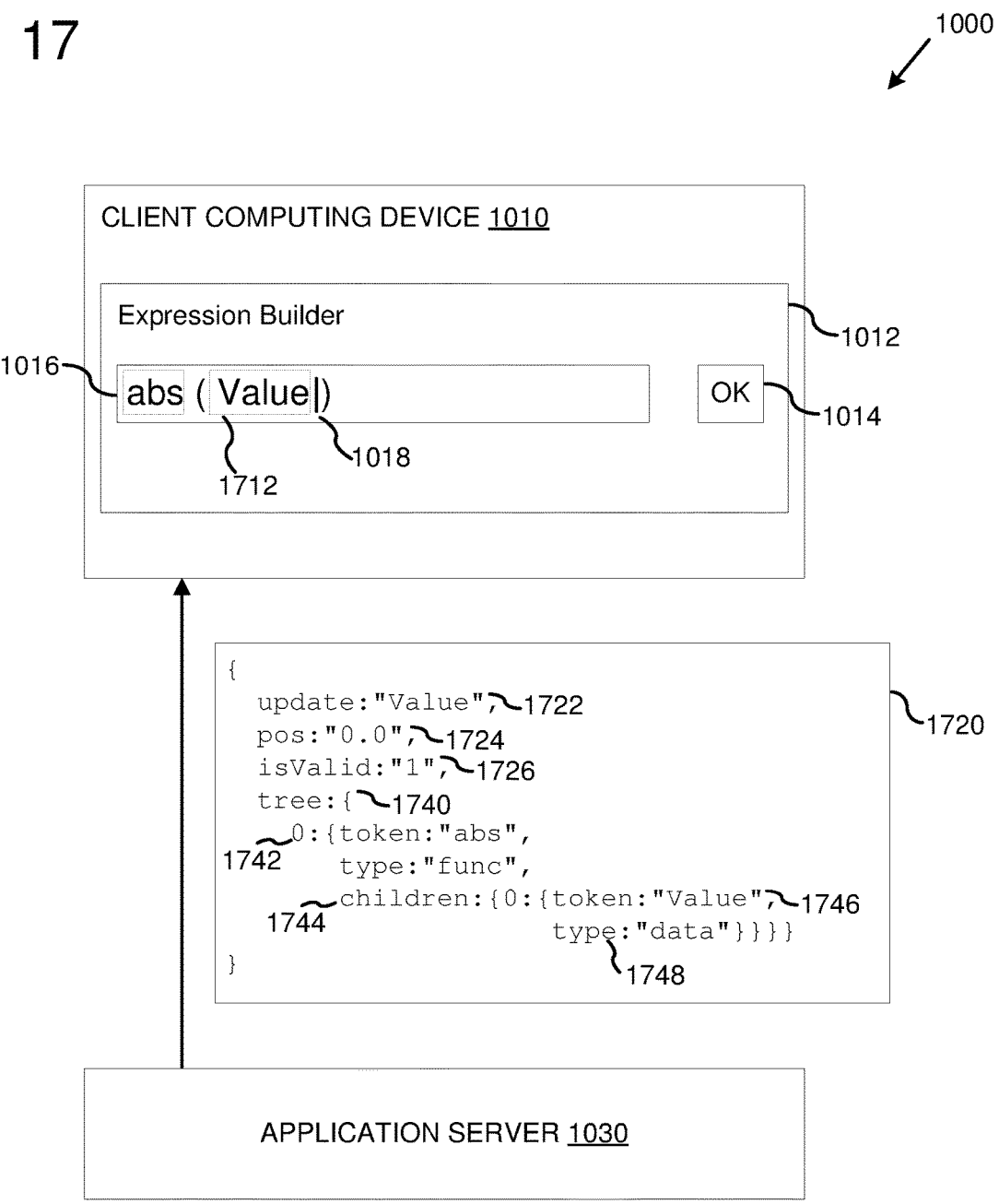

FIG. 17 is another system diagram depicting the example system 1000. In FIG. 17, the application server 1030 is depicted as transmitting an expression update validation message 1720 to the client computing device 1010 in response to the expression update message 1620.

The expression update validation message 1720 includes a value 1726 indicating that the updated expression is valid.

Expression update validation message 1720 comprises an updated expression tree representation 1740 with a root node 1742, corresponding to the position, "0," that contains the token "abs" for the "abs( )" functional entity. The root node 1742 contains a children property 1744 that represents child nodes of the root node 1744. The children property 1744 contains a single child node that has a token value 1746 of the detected change, "Value." The entity type 1748 for the child node has a value of "data," indicating that the token value 1746 is an identifier for a data entity.

The client computing device 1010 can inspect the value 1726 to determine that the detected change resulted in a valid expression. The expression builder user interface component 1012 can use the updated value 1722, the position value 1724, and the updated expression tree representation 1740 to identify a portion of the expression in the textbox 1016 associated with the detected change that represents a valid entity identifier. Once the valid entity identifier is located (in this case the characters "Value"), the expression builder user interface 1012 can decorate the entity identifier with a visual indicator 1712 to signal to the user that it represents a valid entity.

Since the value 1726 indicates that the expression is valid, the client computing device 1010 can enable the button 1014, thus allowing the user to save the expression. In at least some embodiments, the client computing device 1010 can be configured to leave the button 1014 disabled until expression update validation messages have been received for all transmitted expression update messages.

The example scenarios depicted in FIGS. 10-17 are provided for illustration purposes and are not intended to be limiting. The example expression update messages and expression update validation messages depicted in FIGS. 10-17 are formatted using JavaScript Object Notation (JSON). This is for illustration purposes and is not intended to be limiting. Other message formats are possible.

Example 9—Example Computing Systems

Figure 18:
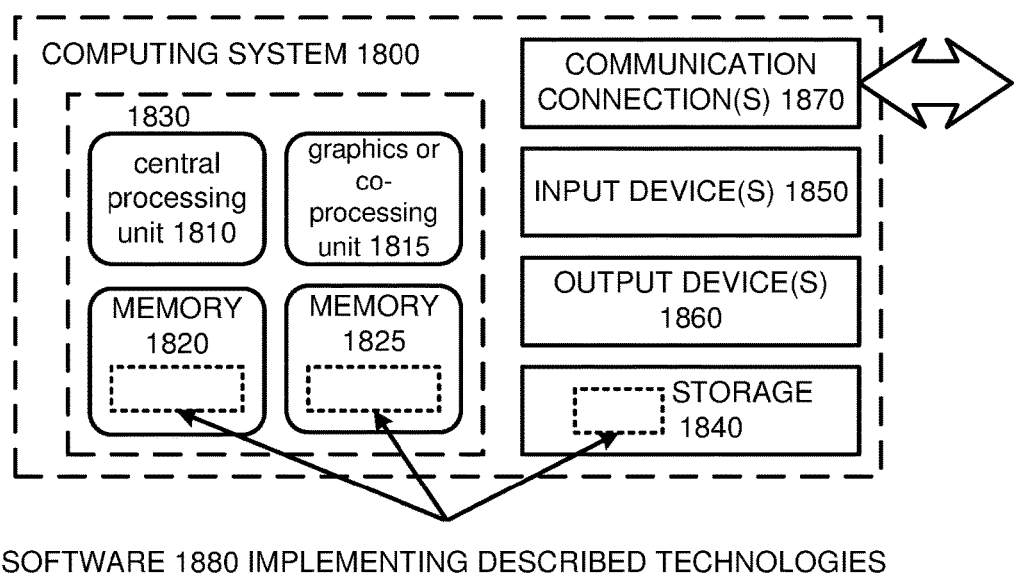
FIG. 18 is a block diagram of an example computing system in which some described embodiments can be implemented.

FIG. 18 depicts a generalized example of a suitable computing system 1800 in which the described innovations may be implemented. The computing system 1800 is not intended to suggest any limitation as to scope of use or functionality, as the innovations may be implemented in diverse general-purpose or special-purpose computing systems.

With reference to FIG. 18, the computing system 1800 includes one or more processing units 1810, 1815 and memory 1820, 1825. In FIG. 18, this basic configuration 1830 is included within a dashed line. The processing units 1810, 1815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 18 shows a central processing unit 1810 as well as a graphics processing unit or co-processing unit 1815. The tangible memory 1820, 1825 may be volatile memory (e.g., registers, cache, RAM), nonvolatile memory (e.g., ROM, EEPROM, flash memory, solid state drives, etc.), or some combination of the two, accessible by the processing unit(s). The memory 1820, 1825 can store software 1880 implementing one or more innovations described herein, in the form of computer-executable instructions suitable for execution by the processing unit(s).

A computing system may have additional features. For example, the computing system 1800 includes storage 1840, one or more input devices 1850, one or more output devices 1860, and one or more communication connections 1870. An interconnection mechanism (not shown) such as a bus, controller, or network interconnects the components of the computing system 1800. Typically, operating system software (not shown) provides an operating environment for other software executing in the computing system 1800, and coordinates activities of the components of the computing system 1800.

The tangible storage 1840 may be removable or non-removable, and includes magnetic disks, magnetic tapes or cassettes, solid state drives, CD-ROMs, DVDs, or any other medium which can be used to store information in a non-transitory way and which can be accessed within the computing system 1800. The storage 1840 can store instructions for the software 1880 implementing one or more innovations described herein.

The input device(s) 1850 may be a touch input device such as a keyboard, mouse, pen, or trackball, a voice input device, a scanning device, or another device that provides input to the computing system 1800. For video encoding, the input device(s) 1850 may be a camera, video card, TV tuner card, or similar device that accepts video input in analog or digital form, or a CD-ROM or CD-RW that reads video samples into the computing system 1800. The output device(s) 1860 may be a display, printer, speaker, CD-writer, or another device that provides output from the computing system 1800.

The communication connection(s) 1870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Example Cloud Computing Environment

Figure 19:
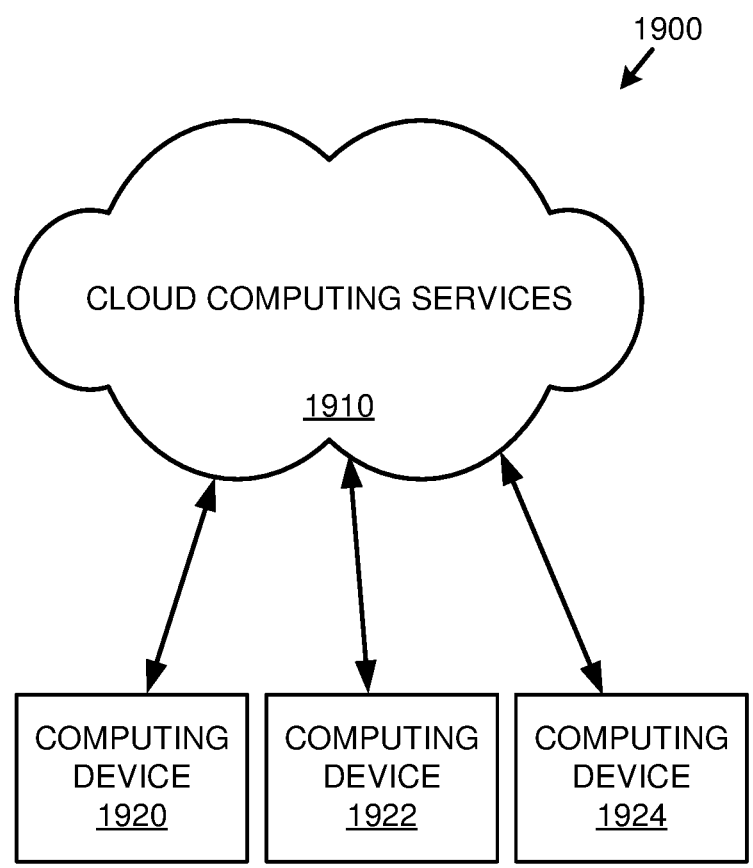
FIG. 19 is an example cloud computing environment that can be used in conjunction with the technologies described herein.

FIG. 19 depicts an example cloud computing environment 1900 in which the described technologies can be implemented. The cloud computing environment 1900 comprises cloud computing services 1910. The cloud computing services 1910 can comprise various types of cloud computing resources, such as computer servers, data storage repositories, networking resources, etc. The cloud computing services 1910 can be centrally located (e.g., provided by a data center of a business or organization) or distributed (e.g., provided by various computing resources located at different locations, such as different data centers and/or located in different cities or countries).

The cloud computing services 1910 are utilized by various types of computing devices (e.g., client computing devices), such as computing devices 1920, 1922, and 1924. For example, the computing devices (e.g., 1920, 1922, and 1924) can be computers (e.g., desktop or laptop computers), mobile devices (e.g., tablet computers or smart phones), or other types of computing devices. For example, the computing devices (e.g., 1920, 1922, and 1924) can utilize the cloud computing services 1910 to perform computing operators (e.g., data processing, data storage, and the like).

Example 11—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 18, computer-readable storage media include memory 1820 and 1825, and storage 1840. The term computer-readable storage media does not include signals and carrier waves. In addition, the term computer-readable storage media does not include communication connections (e.g., 1870).

For example, input circuits, neuron circuits and synapse circuits, as described herein, can be emulated and/or simulated using computer-executable instructions executed on traditional computing hardware.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method for validating a query expression update, the method comprising:
   receiving the query expression update at a server computer from a client computing device over a bidirectional communication channel, wherein the bidirectional communication channel is associated with an expression validation session maintained on the server computer and wherein the query expression update describes a change to an existing query expression, wherein the query expression update comprises an updated portion of the query expression, and the query expression update comprises a position value indicating a position within the query expression where the change has been detected and the updated portion is located, wherein a representation of the existing query expression is maintained as part of the expression validation session on the server computer;
   determining that the query expression update is syntactically valid;
   determining that the query expression update contains an entity identifier;
   determining whether an entity associated with the entity identifier is defined in a database;
   if an entity associated with the entity identifier is defined in the database, transmitting a message to the client computing device from the server computer, over the bidirectional communication channel, indicating that the query expression update is valid; and
   otherwise, transmitting a message to the client computing device from the server computer, over the bidirectional communication channel, indicating that the query expression update is invalid;
   wherein the method further comprises:
   receiving a request from the client computing device to establish the expression validation session;
   creating the expression validation session;
   creating an expression tree in the expression validation session; and
   establishing the bidirectional communication channel with the client computing device.

2. The method of claim 1, wherein:
   the representation of the existing query expression comprises an expression tree; and
   determining whether the query expression update is syntactically valid comprises:
   updating the expression tree using the query expression update; and
   analyzing the updated expression tree to determine whether the expression tree represents a valid expression.

3. The method of claim 2, wherein:
   updating the expression tree comprises adding one or more expression tree nodes to the expression tree; and
   determining that the query expression update contains an entity identifier comprises determining that one of the added expression tree nodes contains the entity identifier.

4. The method of claim 1, wherein determining that the query expression update contains an entity identifier comprises:
   parsing the query expression update, using one or more operator identifiers as delimiters; and
   determining that the parsed query expression update comprises an identifier that is not one of the one or more operator identifiers.

5. The method of claim 1, wherein:
   the query expression update is transmitted by the client computing device in response to detecting that a user has edited a query expression presented in a user interface component of the client computing device.

6. The method of claim 5, further comprising:
   updating the user interface component to indicate whether the query expression update is valid or invalid as the user continues to edit the query expression.

7. The method of claim 1, wherein:
   the expression validation session is associated with a user; and
   the method further comprises:
   if an entity associated with the entity identifier is defined in the database, determining whether the user has permission to access the entity, and
   transmitting the message to the client computing device, over the bidirectional communication channel, indicating that the query expression update is invalid if the user does not have permission to access the entity.

8. The method of claim 1, wherein:
   determining that the query expression update is syntactically valid comprises:
   updating the representation of the query expression to include the change to the query expression at the position indicated by the position value, and determining that the updated query expression representation represents a syntactically valid query expression.

9. One or more computer-readable storage media storing instructions that, when executed by one or more processors, cause the one or more processors to perform operations, the operations comprising:

receiving messages from a client computing device over a bidirectional communication channel associated with an expression validation session, wherein the messages comprise successive expression updates describing changes to an existing query expression, wherein the expression updates comprise updated portions of the existing query expression and positions within the existing query expression where the updated portions are located, and wherein the expression validation session is maintained on a server separate from the client computing device, wherein an expression tree representing the existing query expression is maintained as part of the expression validation session on the server;

validating the expression updates, wherein validating an expression update comprises:
  modifying the expression tree based on the expression update,
  detecting an entity identifier in the modified expression tree,
  transmitting a request to a data store to verify an existence of an entity in the data store associated with the entity identifier, and
  receiving a response from the data store indicating whether an entity associated with the entity identifier exists in the data store; and transmitting expression validation responses to the client computing device via the bidirectional communication channel, wherein an expression validation response indicates whether a corresponding expression update includes an entity identifier associated with an entity in the data store.

10. The one or more computer-readable storage media of claim 9, wherein:
the expression updates represent changes made to an expression via a user interface of the client computing device; and
the expression updates are asynchronously transmitted by the client computing device over the bidirectional communication channel as the changes are made to the expression.

11. The one or more computer-readable storage media of claim 9, wherein:
the operations further comprise determining whether the modified expression tree represents a syntactically valid expression; and
the expression validation response indicates whether the corresponding expression update resulted in a syntactically valid expression.

12. The one or more computer-readable storage media of claim 9, wherein the expression validation response comprises:
the entity identifier;
a validity indicator that indicates whether the entity associated with the entity identifier exists in the data store; and
a position indicator indicating a position in the query expression where the entity identifier is located.

13. The one or more computer-readable storage media of claim 12, wherein:
the expression validation response further comprises a representation of the modified expression tree; and
the position indicator comprises a position in the modified expression tree where the entity identifier is located.

14. The one or more computer-readable storage media of claim 9, wherein:
the data store comprises a relational database; and
the request transmitted to the data store to verify the existence of the entity comprises a query that determines whether a database table column associated with the entity identifier is defined in the relational database.

15. The one or more computer-readable storage media of claim 9, wherein:
the response from the data store comprises identifiers for multiple entities defined in the data store that match the entity identifier; and
the expression validation response transmitted to the client computing device includes the identifiers for the multiple entities.

16. The one or more computer-readable storage media of claim 9, wherein:
the query expression is a Structured Query Language (SQL) expression to be processed as part of a SQL statement by the data store.

17. The one or more computer-readable storage media of claim 9, wherein the bidirectional communication channel is a WebSocket communication channel.

18. A system for validating expression updates, the system comprising:
a client computing device comprising a processor and a memory storing executable instructions that, when executed by the processor, cause the client computing device to perform operations, the operations comprising:
  displaying a query expression in a user interface component,
  detecting a modification of the query expression in the user interface component,
  asynchronously transmitting a description of the modification of the query expression to an application server over a bidirectional communication channel, wherein the description of the modification comprises an updated portion of the query expression and a position within the query expression where the updated portion is located, wherein the bidirectional communication channel is associated with an expression validation session maintained on the application server,
  receiving a response from the application server via the bidirectional communication channel indicating that the modification of the query expression is invalid,
  updating the user interface component to display an indication that a modified portion of the query expression is invalid, and
  preventing the query expression from being saved; and
the application server, wherein the application server comprises another processor, another memory storing other executable instructions that, when executed by the another processor, cause the application server to perform other operations, the other operations comprising:
  receiving the description of the modification of the query expression, comprising the updated portion of the query expression and the position within the query expression where the updated portion is located, via the bidirectional communication channel, updating an expression tree that is part of the expression validation session that is maintained on the application server and that is associated with the bidirectional communication channel, wherein the expression tree is updated based on the description of the modification of the query expression, detecting an entity identifier in an updated portion of the expression tree, determining that the entity identifier is not associated with a data entity in a database connected to the application server, and transmitting the response to the client computing device via the bidirectional communication channel, indicating that the modification of the query expression is invalid.

* * * * *